United States Patent
Tada

(10) Patent No.: US 7,976,224 B2
(45) Date of Patent: Jul. 12, 2011

(54) ECCENTRIC THRUST BEARING ASSEMBLY

(75) Inventor: Seiji Tada, Osaka (JP)

(73) Assignee: JTEKT Corporation, Osaka (JP)

( * ) Notice: Subject to any disclaimer, the term of this patent is extended or adjusted under 35 U.S.C. 154(b) by 232 days.

(21) Appl. No.: 12/466,938

(22) Filed: May 15, 2009

(65) Prior Publication Data

US 2009/0226126 A1   Sep. 10, 2009

Related U.S. Application Data

(62) Division of application No. 10/551,700, filed as application No. PCT/JP2004/004898 on Apr. 5, 2004, now Pat. No. 7,575,378.

(30) Foreign Application Priority Data

| Apr. 3, 2003 | (JP) | 2003-100524 |
|---|---|---|
| Apr. 3, 2003 | (JP) | 2003-100551 |
| Apr. 3, 2003 | (JP) | 2003-100580 |
| Apr. 3, 2003 | (JP) | 2003-100760 |

(51) Int. Cl.
*F16C 19/10* (2006.01)
*F16C 19/00* (2006.01)
*F16H 33/10* (2006.01)

(52) U.S. Cl. .............. 384/590; 384/613; 74/86

(58) Field of Classification Search ............ 74/86, 87; 384/590, 604, 613, 614, 615, 618, 619, 621, 384/622, 623
See application file for complete search history.

(56) References Cited

U.S. PATENT DOCUMENTS

| 2,923,582 A | 2/1960 | Dunn |
|---|---|---|
| 4,156,585 A | 5/1979 | Ross |
| 4,181,479 A | 1/1980 | Ross |
| 4,259,043 A | 3/1981 | Hidden et al. |
| 4,431,236 A | 2/1984 | Orain |
| 4,474,543 A | 10/1984 | Hiraga et al. |
| 4,645,435 A | 2/1987 | Sugimoto |
| 4,940,342 A | 7/1990 | Miyazawa et al. |
| 5,102,315 A | 4/1992 | Terauchi et al. |
| 5,167,494 A | 12/1992 | Inagaki et al. |
| 5,423,663 A | 6/1995 | Fukui |
| 5,435,706 A | 7/1995 | Matsumoto et al. |
| 5,758,978 A | 6/1998 | Satoda et al. |
| 5,846,000 A | 12/1998 | Tanishiki |
| 5,915,933 A | 6/1999 | Iizuka et al. |
| 6,152,712 A | 11/2000 | Ueda |
| 6,206,665 B1 | 3/2001 | Iizuka |

(Continued)

FOREIGN PATENT DOCUMENTS

EP   0272892 A   6/1988

(Continued)

*Primary Examiner* — Thomas R Hannon
*Assistant Examiner* — Phillip A Johnson
(74) *Attorney, Agent, or Firm* — Birch, Stewart, Kolasch & Birch, LLP

(57) ABSTRACT

The invention provides an eccentric thrust bearing assembly capable of bearing axial loads in opposite directions.

A first aspect of the invention relates to a thrust bearing assembly a1 wherein a first radially outside member and a second radially inside member oppose each other at first positions a21 separately located and clamp therebetween a rolling element a8 disposed at each of the first positions a21, whereas a second radially outside member and a first radially inside member oppose each other at second positions a22 of a different phase from that of the first positions a21 and clamp therebetween a rolling element a8 disposed at each of the second positions a22. In this bearing assembly a1, respective certain portions of the rolling elements are present on the same plane.

12 Claims, 15 Drawing Sheets

U.S. PATENT DOCUMENTS 6,273,616 B1 8/2001 Pflug
6,315,460 B1 11/2001 Nieman et al.

FOREIGN PATENT DOCUMENTS

| | | |
|---|---|---|
| FR | 1.339.266 | 10/1963 |
| FR | 2455196 A1 | 11/1980 |
| FR | 2502713 A1 | 10/1982 |
| GB | 2 054 044 A | 2/1981 |
| JP | 55-155916 A | 12/1980 |
| JP | 60-111080 A | 6/1985 |
| JP | 5-87128 A | 4/1993 |
| JP | 2001-73967 A | 3/2001 |
| JP | 2002-242857 A | 8/2002 |
| JP | 2002-364557 A | 12/2002 |

ECCENTRIC THRUST BEARING ASSEMBLY

This application is a Divisional of application Ser. No. 10/551,700 filed on Nov. 3, 2005 and for which priority is claimed under 35 U.S.C. §120. Application Ser. No. 10/551,700 is the national phase of PCT International Application No. PCT/JP04/004898 filed on Apr. 5, 2004 under 35 U.S.C. §371. The entire contents of each of the above-identified applications are hereby incorporated by reference.

TECHNICAL FIELD

The present invention relates to an eccentric thrust bearing assembly.

BACKGROUND ART

A public-use single-row eccentric thrust bearing assembly heretofore known in the art includes a pair of races, and rolling elements interposed between these races. This bearing assembly has a structure wherein a plurality of rolling elements such as balls are interposed between the two plate-like races in opposing relation. Thus, the two races are allowed to move in a manner to decenter as radially shifted from each other and are also allowed to pivotally move relative to each other.

A public-use double-row eccentric thrust bearing assembly heretofore known in the art includes: a single inner race; two outer races opposing either side of the inner race; and two rows of rolling elements interposed between these races. This double-row eccentric thrust bearing assembly includes the two outer races, whereas the two rows of rolling elements bear axial loads in mutually opposite directions, respectively, whereby the bearing assembly is able to bear the axial loads in the opposite directions.

Some of the public-use eccentric thrust bearing assemblies permit the inner race and the outer races to be freely rotate relative to each other.

In such single-row and double-row eccentric thrust bearing assemblies in public use, the balls as the rolling elements are randomly disposed in space between the races, or arranged in a full-type ball bearing fashion.

The conventional eccentric thrust bearing assemblies have some problems.

A first problem pertains to the conventional single-row eccentric thrust bearing assembly. The conventional single-row eccentric thrust bearing assembly is able to bear the axial load in one direction, or the load acting in the direction to compress the rolling elements, but is unable to bear the axial loads in the opposite directions. That is, the bearing assembly is unable to bear the axial load acting in a direction to draw the two opposite races apart from each other. In order to bear the axial loads in the opposite directions, the bearing assembly must be constructed as the double-row thrust bearing wherein the rolling elements are arranged in two rows (double-row type). In the case of the double-row bearing assembly, however, the problem (first problem) arises that a bearing width (axial width of the bearing assembly) is increased.

A second problem pertains to the conventional double-row thrust bearing assembly which includes a large race portion. In cases, therefore, it is extremely difficult to machine the race portion. For instance, it is extremely difficult to ensure the flatness of a raceway surface. Hence, it is not easy to fabricate a larger bearing assembly. Furthermore, since the race portion formed from an iron-base metal such as a bearing steel is large in size, the bearing assembly is increased in weight. This also leads to difficulty in reducing the weight of the bearing assembly.

A third problem is an excessive energy loss because the conventional double-row eccentric thrust bearing assembly suffers great resistance during operation. In a case where the rolling elements are randomly disposed or arranged in a full-type ball bearing fashion, as described above, the rolling elements contact each other and rub against each other to produce friction therebetween. As a countermeasure against this problem, it may be contemplated to employ a cage for maintaining a relative positional relation among the rolling elements. In this case, however, the friction results from sliding contact between the cage and the race.

A fourth problem pertains to a fact that no investigation has ever been made to define a proper gap between inside and outside members with respect to a decenterable range of the bearing assembly, the inside and outside members provided for decentering movement. Hence, the gap between the inside and outside members and the size of the race or the like are greater than necessary, so that the bearing assembly has an unduly great size. This results in the increased weight and cost of the bearing assembly.

In view of the foregoing problems, the invention has been accomplished, providing an eccentric thrust bearing assembly capable of bearing the axial loads in the opposite directions.

A first object of the invention is to solve the first problem and to provide an eccentric thrust bearing assembly which features a smaller bearing width than that of the double-row structure, and which is capable of bearing the axial loads in the opposite directions.

A second object of the invention is to solve the second problem and to provide a double-row eccentric thrust bearing assembly which facilitates the upsizing and weight reduction of the bearing assembly by reducing the size of the race portion.

A third object of the invention is to solve the third problem and to provide a double-row eccentric thrust bearing assembly which permits relative movement of a constant distance and suffers an extremely low energy loss associated with the relative movement.

A fourth object of the invention is to solve the fourth problem and to provide a double-row eccentric thrust bearing assembly permitting free relative rotation, which defines a more optimum gap between the individual members with respect to the decenterable range of the bearing assembly thereby achieving the downsizing and weight reduction of the bearing assembly.

DISCLOSURE OF THE INVENTION

An eccentric thrust bearing assembly according to a first aspect of the invention for achieving the first object comprises: a first radially outside member and a first radially inside member positioned on a radially inner side of the first radially outside member; and a second radially outside member and a second radially inside member positioned on a radially inner side of the second radially outside member, the second radially outside and inside members disposed in opposing relation with the first radially outside and inside members, wherein the first radially outside member opposes the second radially inside member at three or more first positions separately located along a circumferential direction thereby clamping rolling elements therebetween, the rolling elements disposed at the first positions, whereas the second radially outside member opposes the first radially inside member at three or more second positions separately located along the circumferential direction and having a different phase from that of the first positions, thereby clamping rolling elements therebetween, the rolling elements disposed at the second positions, wherein the first radially outside member and the first radially inside member define a gap therebetween so as to be allowed to move relative to each other in the radial direction and the circumferential direction, whereas the second radially outside member and the second radially inside member define a gap therebetween so as to be allowed to move relative to each other in the radial direction and the circumferential direction, wherein the first radially outside member and the second radially outside member are integrally interconnected, whereas the first radially inside member and the second radially inside member are integrally interconnected, and wherein respective certain portions of the rolling elements are present on the same plane. In such a constitution, the members corresponding to the individual members conventionally arranged in the double rows in the eccentric thrust bearing assembly are alternately disposed in a row, whereby an axial distance between the members conventionally constituting the respective rows may be decreased so that the bearing width may be decreased as compared with that of the double-row bearing assembly. Specifically, the first radially outside member, the second radially inside member and the rolling elements clamped between these members as separately located at three or more places along the circumferential direction may function as a first-row eccentric thrust bearing portion (1) of the conventional double-row bearing assembly. On the other hand, the second radially outside member, the first radially inside member and the rolling elements clamped between these members as separately located at three or more places along the circumferential direction may function as a second-row eccentric thrust bearing portion (2). According to the first aspect of the invention, the radially outside members are integrally interconnected, whereas the radially inside members are integrally interconnected. Hence, the portion equivalent to the portion (1) of the conventional double-row eccentric thrust bearing assembly is adapted to bear the axial load in one direction, whereas the portion equivalent to the portion (2) of the conventional eccentric thrust bearing assembly is adapted to bear the axial load in the other direction. The first position and the second position have different phases, while the radially outside member and the radially inside member define a gap therebetween with respect to a movable plane. Hence, the bearing assembly of this aspect may have a structure wherein the respective rows of rolling elements are positioned closer to each other with respect to the axial direction, while the respective certain portions of the rolling elements are present on the same plane. Furthermore, the radially outside member and the radially inside member are allowed to move relative to each other. What is more, the above constitution permits the bearing assembly to be supplied as an assembled bearing unit from which none of the members thereof is separated. It is more preferred that all the rolling elements have their centers positioned on the same plane. Such a constitution permits the bearing assembly to have a single-row structure, thus achieving the minimum axial width of the bearing assembly.

According to the first aspect of the invention, it is preferred that the first radially outside member includes: outer races separately provided at the respective first positions separately located; and a first radially outside case to which all these outer races are mounted, that the second radially outside member includes: outer races separately provided at the respective second positions separately located; and a second radially outside case to which all these outer races are mounted, that the first radially inside member includes: inner races separately provided at the respective first positions separately located; and a first radially inside case to which all these inner races are mounted, that the second radially inside member includes: inner races separately provided at the respective second positions separately located; and a second radially inside case to which all these inner races are mounted, and that the rolling element is clamped between the outer race and the inner race. In this case, the separate races are disposed at the respective positions of the rolling elements separately located and hence, each of the races may be downsized. In a case where the race is increased in size, it is difficult to ensure the precise flatness of the raceway surface. However, the downsized race makes it easy to fabricate a larger bearing assembly. Furthermore, the weight of the whole body of the bearing assembly may be reduced because the race portion formed from a bearing steel or the like is decreased while the case portion is formed from a metal of low specific gravity such as an aluminum alloy or from a resin.

According to the first aspect of the invention, a constitution may also be made wherein a relatively movable range between the radially outside member and the radially inside member, which is provided by the gap, substantially corresponds to a movable range of the rolling element. In such a constitution, an excessive space may be excluded from both of the gap between the radially outside member and the radially inside member, and the gap defined on the race for providing a movable space of the rolling element, or the excessive space may be minimized. Therefore, the bearing assembly may be downsized and may also attain an even greater decenterable range.

Further according to the first aspect of the invention, the eccentric thrust bearing assembly may also have the following constitution. That is, the constitution is made such that the respective groups of the first positions and the second positions are disposed at N places (N indicating an integer of 3 or more) with equal spacing, that the first and second radially outside cases have the same configuration, which includes: an outside ring portion defining an outer periphery of the bearing assembly; and N inward tongues projected radially inwardly from the outside ring portion as positioned at regular circumferential space intervals, that the first and second radially inside cases have the same configuration, which includes: an inside ring portion defining an inner periphery of the bearing assembly; and N outward tongues projected radially outwardly from the inside ring portion as positioned at regular circumferential space intervals, that all the outward tongues have the inner races mounted thereto and aligned on the same circle, whereas all the inward tongues have the outer races mounted thereto and aligned on the same circle, all the inner and outer races comprising disk-like members of the same configuration, and that the first positions and the second positions are alternately located on the same circle at $360/(2N)°$ circumferential phase shift relative to one another. In such a constitution, the first positions and the second positions of the rolling elements may be uniformly distributed with respect to the circumferential direction and the radial direction. Hence, the bearing assembly is adapted to bear the axial loads in the opposite directions in a more stable manner and also to bear the moment load in a more stable manner, the moment load caused by an axial load applied along a decentered axis. In addition, since the individual races have the same configuration, the individual race members may be standardized.

According to the first aspect of the invention, the bearing assembly may further comprise first cage guides surrounding the respective races. Such a constitution facilitates the positional adjustment of the rolling elements. It is not easy to adjust the rolling element to an optimum position on the race. However, the bearing assembly under a small pre-load may be subjected to the maximum relative movement with respect to every radial and circumferential direction, whereby any displaced rolling element may be locked by the first cage guide and adjusted into position as properly slid on the race. Thus, the rolling element may be easily placed at the optimum position on the race. This first cage guide also serves to prevent the invasion of foreign substances into space between the opposite races and the leakage of a lubricant.

According to the first aspect of the invention, the bearing assembly may further comprise a single second cage guide for maintaining a relative positional relation among the all of the rolling elements. Such a constitution prevents the rolling elements from being displaced even when the rolling elements are subjected to an unbalanced load.

A double-row eccentric thrust bearing assembly according to a second aspect of the invention for achieving the second object comprises: two axially outside cases axially opposing each other and integrally interconnected; and an axially inside case interposed between these axially outside cases, wherein three or more inner races are provided on the axially inside case on each of its opposing sides to each of the two outside cases (the axially outside cases) as separately located along a circumferential direction, whereas three or more outer races are provided on each of the two axially outside cases as separately located at positions opposite the respective inner races, each of the inner races and the outer races in opposing relation clamping a rolling element therebetween, and wherein movable ranges of the individual rolling elements between the respective pairs of races separately disposed are all substantially equal to one another. In such a constitution, the races are separately located so that the individual races may be downsized. This facilitates the machining of the individual races so that it becomes easy to fabricate a larger bearing assembly. Three or more races are provided along the circumferential direction, while each of the rolling elements is clamped between a respective pair of races. Hence, the axially inside case and the axially outside cases are each supported on three or more points circumferentially arranged and thence, are able to bear the axial loads and the moment load. The axially inside case and the axially outside cases, defining portions other than the races in contact with the rolling elements, are independent from the races. Therefore, the axially inside and outside cases may be formed from the metal of low specific gravity, such as an aluminum alloy, instead of the iron-base metal such as a bearing steel, thus contributing to the weight reduction of the bearing assembly. In addition, all the movable ranges of the rolling elements on the races separately located are substantially equal to one another. Therefore, when any one of the rolling elements is moved across the whole movable range thereof, all the other rolling elements are also moved substantially across the whole movable ranges thereof. The race size is a determinant factor of the movable range of the rolling element. All the movable ranges of the rolling elements are defined to be substantially equal to one another whereby all the races may have the smallest or the smallest possible size and some of the plural races need not be unduly increased in size. The above constitution permits the bearing assembly to be supplied as an assembled bearing unit from which none of the members thereof is separated.

According to the second aspect of the invention, it is preferred that a relatively movable range provided by a gap between the axially inside case and the axially outside case substantially corresponds to the movable range of the rolling element. In such a constitution, when the axially inside case and the axially outside cases are relatively moved so far as to eliminate the gap therebetween, the rolling elements are also moved so far as to eliminate the respective gaps defined on the races. Accordingly, an excessive space may be eliminated or minimized, so that the bearing assembly may be downsized and may also attain an increased decenterable range.

According to the second aspect of the invention, all the inner and outer races provided on each of the surfaces of the axially inside case and on the respective surface of the axially outside cases may be arranged with the same PCD (on the same circle) on the surface in question and uniformly distributed along the circumferential direction. In such a constitution, the rolling elements serving as the support points of the bearing assembly are uniformly distributed along the circumferential and radial directions, so that the bearing assembly is able to bear the axial loads in the opposite directions and the moment load in a more stable manner, the moment load resulting from radially varied points of application of the axial load. In addition, the bearing assembly as a whole may be increased in load capacity because the loads on the individual rolling elements are equalized. If, in this case, the bearing assembly is constituted such that all the inner and outer races have a circular shape of the same radius, whereas the axially outside cases and the axially inside case have annular shapes, the bearing assembly may have a circumferentially uniform structure so as to allow for relative movement of a constant width with respect to every direction of a movable plane. In addition, since all the inner and outer races have the circular shape of the same radius, the individual race members may be standardized.

According to the second aspect of the invention, the bearing assembly may further comprise a cage guide disposed around each of the inner and outer races. Such a constitution facilitates the positional adjustment of the rolling elements. It is not easy to adjust the rolling element to the optimum position on the race. However, the bearing assembly under a small pre-load may be subjected to the maximum relative movement with respect to every radial direction (the overall circumference), whereby any displaced rolling element may be locked by the cage guide and adjusted into position as properly slid on the race. Thus, the rolling element may be easily placed at the optimum position on the race. The cage guide also has a sealing function for the whole bearing assembly because the cage guide prevents the invasion of foreign substances into space between the opposing races and the leakage of the lubricant, such as a lubricating oil or grease.

A double-row eccentric thrust bearing assembly according to a third aspect of the invention for achieving the third object comprises: two annular axially outside members coaxially opposing each other and integrally interconnected; and an annular axially inside member coaxially interposed between these two axially outside members, each of the two axially outside members including: an annular axially outside case; and an outer race formed of an annular plate mounted to an inner side of the axially outside case, the axially inside member including: an annular axially inside case; and an inner race formed of an annular plate radially projecting from the axially inside case, a plurality of rolling elements clamped between either side of the inner race and a respective opposing side of the two outer races to the inner race, the bearing assembly further comprising a rolling-element guide fixed to the axially inside member or the axially outside member and serving to limit a movable range of each of the rolling elements to a predetermined range. In such a constitution, the rolling elements discretely separated by the rolling-element guide are prevented from contacting with one another. The rolling-element guide is fixed to the axially inside member or the axially outside member so as to be prevented from sliding on these members. Thus, the rolling elements are allowed to move with less resistance within the respective movable ranges limited by the rolling-element guide. Since the axially outside members and the axially inside member have annular shapes and are coaxially arranged, an annular gap of a given width is defined between these members. Furthermore, the movable range of each rolling element limited by the rolling-element guide is also fixed and hence, the bearing assembly is adapted for the relative movement of a constant distance. It is preferred that the predetermined range limited by the rolling-element guide is a circular range of a predetermined radius, because the bearing assembly is adapted for the relative movement of a constant distance. The rolling-element guide limits the movable range of each rolling element. At the same time, the rolling-element guide also facilitates the adjustable positioning of the individual rolling elements at the optimum positions on the respective races. That is, the bearing assembly under a small pre-load may be subjected to the maximum relative movement along the overall circumference, whereby any displaced rolling element may be adjusted to the optimum position as slid on the race.

Furthermore, the bearing assembly of the third aspect of the invention may be supplied as an assembled bearing unit from which none of the members thereof is separated. In this bearing assembly, each of the rolling elements is allowed to move only in the range limited by the rolling-element guide fixed to the axially inside member, so that each rolling element is not allowed to move beyond this range. Therefore, the axially inside member and the axially outside member, for example, are not allowed to rotate relative to each other beyond a predetermined angular range.

According to the third aspect of the invention, it is preferred that a relatively movable range provided by a radial gap between the axially outside member and the axially inside member substantially corresponds to the movable range of the rolling element. In such a constitution, when the axially inside member and the axially outside member are relatively moved so far as to eliminate the radial gap therebetween, the rolling element is also moved so far as to eliminate the gap defined between itself and the rolling-element guide. That is, when the axially inside member and the axially outside member are relatively moved across the whole relatively movable range, the individual rolling elements are also moved substantially across the movable ranges thereof. Accordingly, an excessive space between the axially inside member and the axially outside member may be eliminated or minimized. Thus, the bearing assembly may be downsized and may also attain an increased decenterable range.

According to the third aspect of the invention, it is preferred that the rolling-element guide has an annular shape and is formed with three or more movable-range delimiting holes arranged on the same circle with equal circumferential spacing, whereas one rolling element is disposed in each of the movable-range delimiting holes. In such a constitution, the rolling elements disposed in the respective movable-range delimiting holes are uniformly distributed in the circumferential and radial directions, so that the bearing assembly is adapted to bear the axial loads and the moment load in a more stable manner. Since only one rolling element is disposed in each movable-range delimiting hole, the rolling elements are prevented from contacting each other to cause friction.

According to the third aspect of the invention, it is preferred that a radially movable distance of the rolling element limited by the rolling-element guide substantially corresponds to a radial width of the inner race or the outer race. Such a constitution may minimize the radial width of the inner race or the outer race. This leads to the reduction of the weight and cost of the bearing assembly.

A double-row eccentric thrust bearing assembly according to a fourth aspect of the invention for achieving the fourth object comprises: two annular axially outside members coaxially opposing each other and integrally interconnected; and an annular axially inside member coaxially interposed between these two axially outside members, each of the two axially outside members including: an annular axially outside case; and an outer race formed of an annular plate mounted to the axially outside case, the axially inside member including: an annular axially inside case; and an inner race formed of an annular plate radially projecting from the axially inside case, a plurality of rolling elements clamped between either side of the inner race and a respective opposing side of the two outer races to the inner race, wherein a relatively movable range provided by a radial gap between the axially outside member and the axially inside member substantially corresponds to a radially movable distance of the rolling element. This bearing assembly permits free relative rotation between the axially inside member and the axially outside member because the inner race and the two outer races in opposing relation all have the circumferentially continuous annular shape. Furthermore, all the cases and the races of the axially inside member and the axially outside members have the annular shapes and are coaxially arranged, so that a radial gap between the axially outside member and the axially inside member may have a constant space distance with respect to the overall circumference. Accordingly, the bearing assembly is adapted to be decentered by a constant distance with respect to every radial direction.

Further according to the fourth aspect of the invention, the relatively movable range provided by the radial gap between the axially outside member and the axially inside member substantially corresponds to the radially movable distance of the rolling element. Therefore, when the bearing assembly is decentered so far as to substantially eliminate the radial gap between the axially outside member and the axially inside member, the rolling elements are also moved in the decentered direction so far as to eliminate the respective radial gaps defined on the race. Thus, an excessive space may be eliminated or minimized. As a result, the bearing assembly may be downsized and may also attain an increased decenterable range.

According to the fourth aspect of the invention, it is preferred that the plural rolling elements are circumferentially arranged with equal spacing and provided with an annular cage for rollably retaining the rolling elements as maintaining the relative positional relation thereof, and that the radially movable distance of the rolling elements is provided by a radial gap between the cage and the axially inside member and between the cage and the axially outside member. The bearing assembly of such a constitution is adapted to bear the axial loads and the moment load in a more stable manner because the rolling elements serving as the support points of the bearing assembly are substantially uniformly distributed along the circumferential direction while the cage maintains the relative positional relation among the rolling elements. In addition, the loads on the individual rolling elements may be equalized, so that the bearing assembly as a whole is increased in load capacity. Furthermore, the rolling elements are allowed to move radially because of the radial gaps between the cage and the axially inside member and between the cage and the axially outside member. What is more, the cage facilitates the positioning of each rolling element at the optimum position on the race. It is not easy to adjust the rolling element to the optimum position on the race. However, the bearing assembly under a small pre-load may be subjected to the maximum radial decentering with respect to the overall circumference, whereby the positional adjustment may be accomplished easily. In a case where the rolling elements are displaced, the cage abuts against the axially outside member or the axially inside member, so as to be slid on the race together with the rolling elements, whereby the rolling element and the cage accommodating these rolling elements are adjusted into position.

BEST MODES FOR CARRYING OUT THE INVENTION

The embodiments of the invention will hereinbelow be described with reference to the accompanying drawings.

Figure 1:
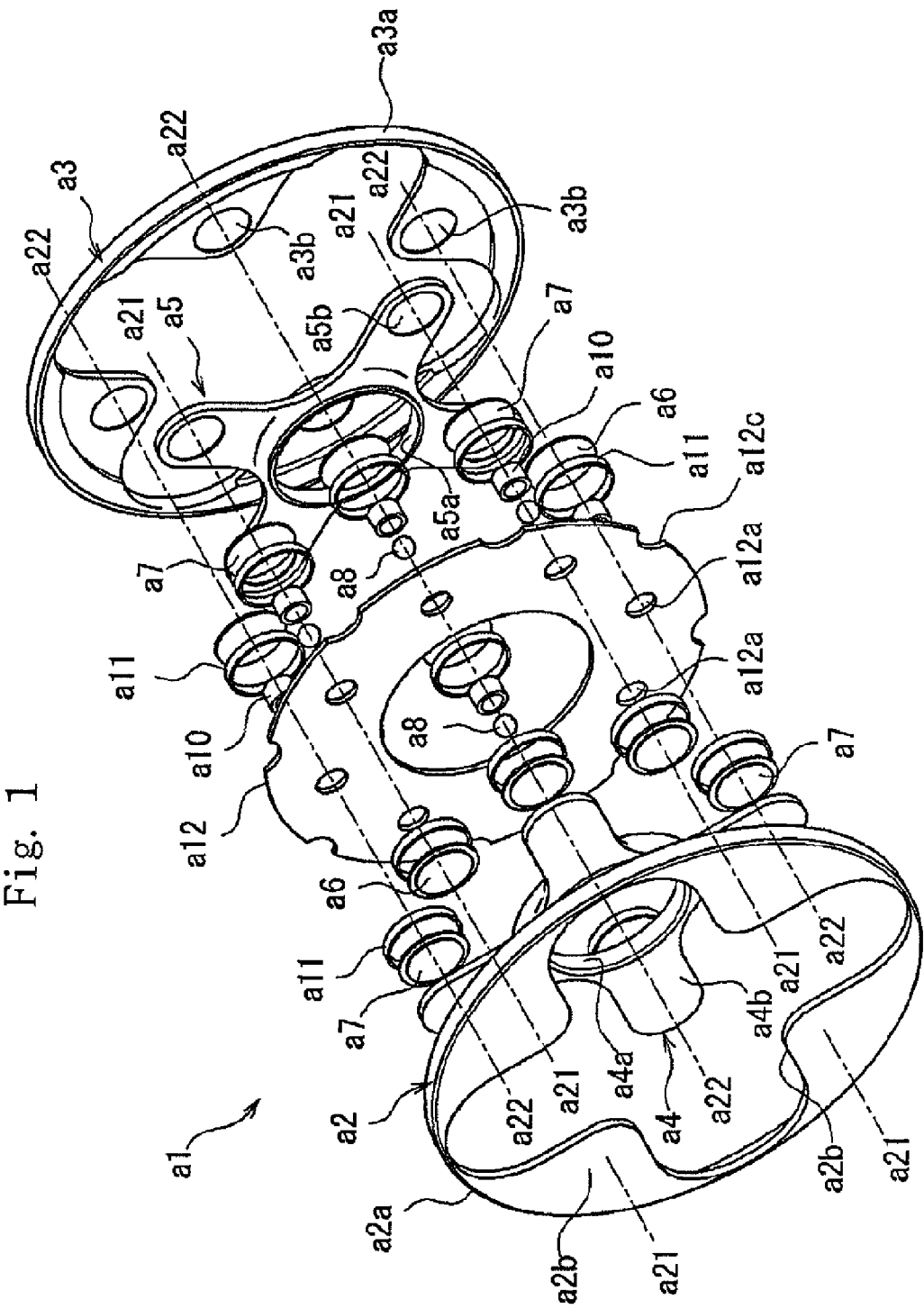
FIG. 1 is an exploded perspective view showing an arrangement of an eccentric thrust bearing assembly according to one embodiment of a first aspect of the invention.
Figure 2:
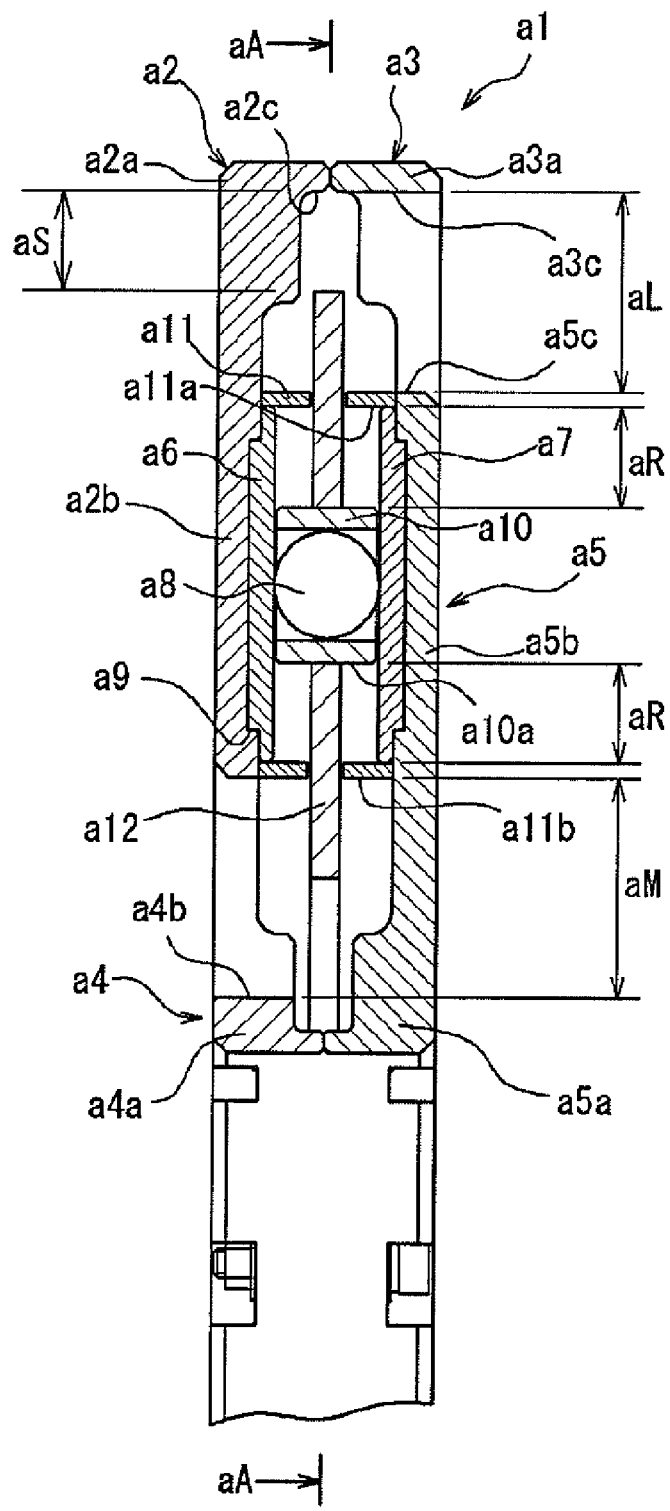
FIG. 2 is an axial cross sectional view of the eccentric thrust bearing assembly according to the one embodiment of the first aspect of the invention.

FIG. 1 is an exploded perspective view showing an arrangement of an eccentric thrust bearing assembly a1 according to one embodiment of a first aspect of the invention. FIG. 2 is an axial cross sectional view of the bearing assembly a1 on the line passing through the center of a ball a8 (a half section from the center to an outer periphery). A circumferential position of the section of FIG. 2 is defined to be a central position of a inward tongue a2b of a first radially outside case a2. FIG. 2 shows a state where the ball a8 is not moved in any direction (hereinafter, also referred to as "standard state"). As shown in FIG. 1, a radially outside member constituting the outer periphery and such of the bearing assembly a1 includes: a first radially outside member; and a second radially outside member. The first radially outside member includes: the first radially outside case 2; and disk-like outer races a6 mounted thereto. The second radially outside member includes: a second radially outside case a3; and the disk-like outer races a6 mounted thereto. The first radially outside case a2 includes: an outside ring portion a2a constituting the outer periphery of the bearing assembly a1; and four inward tongues a2b projected radially inwardly from the outside ring portion a2a and disposed at 90° intervals circumferentially of the ring portion. The second radially outside case a3 has the same configuration as the first radially outside case a2, including a similar outside ring portion a3a; and four similar inward tongues a3b. The first radially outside case a2 and the second radially outside case a3 oppose each other with their phases circumferentially shifted 45° relative to each other. Therefore, the respective inward tongues a2b and a3b of these outside cases do not oppose each other and are alternately disposed at 45° intervals circumferentially of the cases.

A radially inside member constituting an inner periphery and the like of the bearing assembly a1 includes: a first radially inside member and a second radially inside member. The first radially inside member includes: a first radially inside case a4; and disk-like inner races a7 mounted thereto. The second radially inside member includes: a second radially inside case a5; and the disk-like inner races a7 mounted thereto. The first radially inside case a4 is disposed radially inwardly of the first radially outside case a2, constituting the inner periphery and the like of the bearing assembly a1. The first radially inside case includes: an inside ring portion a4a constituting the inner periphery of the bearing assembly a1; and four outward tongues a4b projected radially outwardly from the inside ring portion a4a and disposed at 90° intervals circumferentially of the ring portion. The second radially inside case a5 is disposed radially inwardly of the second radially outside case a3. The second racially inside case has the same configuration as the first radially inside case a4, including a similar inside ring portion a5a; and four similar inward tongues a5b. The first radially inside case a4 and the second radially inside case a5 oppose each other with their phases circumferentially shifted 45° relative to each other. Therefore, the respective tongues a4b and a5b of these inside cases do not oppose each other and are alternately disposed at 45° intervals circumferentially of the cases.

The four inward tongues a2b of the first radially outside case a2 oppose the four outward tongues a5b of the second radially inside case a5 at first positions a21 of the same phase, respectively. On the other hand, the four inward tongues a3b of the second radially outside case a3 oppose the four outward tongues a4b of the first radially inside case a4 at second positions a22 of the same phase, respectively. All the inward tongues a2b and a3b are each provided with one disk-like outer race a6 on a respective opposing side thereof (eight outer races in total). Likewise, all the outward tongues a4b and a5b are each provided with one disk-like inner race a7 on a respective opposing side thereof (eight inner races in total), the inner race a7 having the same plate-like configuration as that of the outer race a6. A total number of 8 balls a8 as rolling elements are each interposed between a respective pair of the outer race a6 and the inner race a7. All these balls a8 have their centers located on the same plane so that the embodiment is constituted as a single-row eccentric thrust bearing assembly.

As shown in FIG. 1 and FIG. 2, the balls are discretely inserted in cylindrical cages a10. A ring-like first cage guide a11 is fitted about each of the outer races a6 and the inner races a7, thus enclosing each of the outer and inner races a6, a7 (FIG. 2). The first cage guide a11 projects toward the rolling element from a raceway surface, as fitted about each of the outer and inner races a6, a7. Therefore, an inside surface of the first cage guide a11 defines a wall surface about each of the outer and inner races a6, a7, the wall surface extending perpendicularly to the raceway surface. A relative positional relation among the all of the cages a10 retaining all the balls a8 with their centers located on the same plane is retained by a single second cage guide a12 formed of a substantially donut-shaped disk. The second cage guide a12 is formed with cage insertion holes a12a at a total number of 8 places located at 45° intervals circumferentially of the guide. The cylindrical cage a10 is fitted in the cage insertion hole a12a (FIG. 2). All the balls a8 are retained at regular space intervals by means of these second cage guide a12 and the cages a10. There may be a case where the rolling elements are subjected to an unbalanced load when a moment load is applied to the bearing assembly a1. When some of the balls a8 are lifted up due to the unbalanced load, these lifted balls a8 may possibly be moved. However, the second cage guide a12 obviates the problem that some of the balls a8 are moved to be displaced. The second cage guide a12 is formed with arcuate recesses a12c on its outside edge, the recesses arranged with equal circumferential spacing. The arcuate recess serves as a relief for a screw a15 interconnecting the two radially outside cases.

Figure 3:
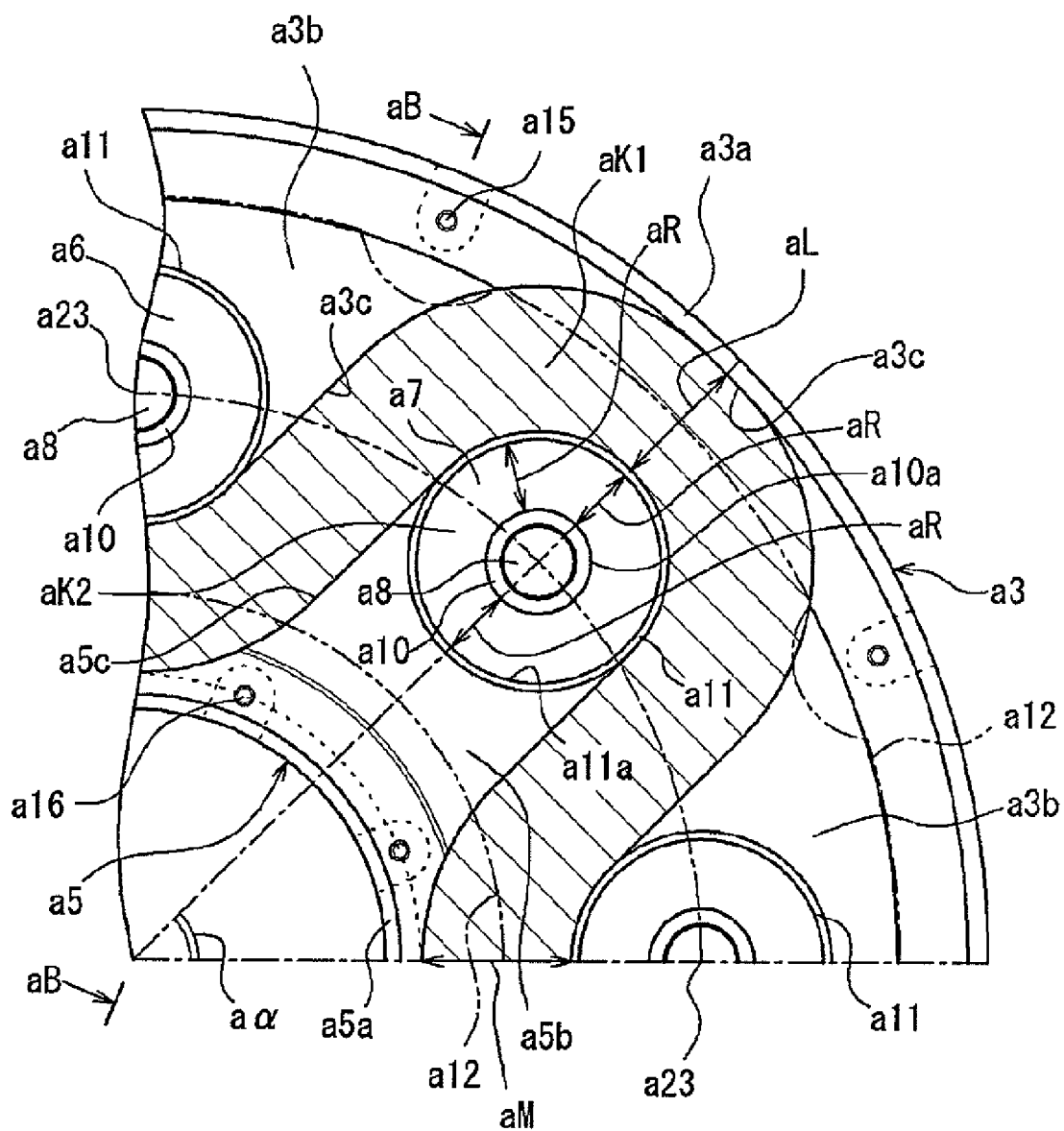
FIG. 3 is a front view showing an interior of a principal part of the bearing assembly in section on the line A-A in FIG. 2, the principal part excluding a second cage guide.
Figure 4:
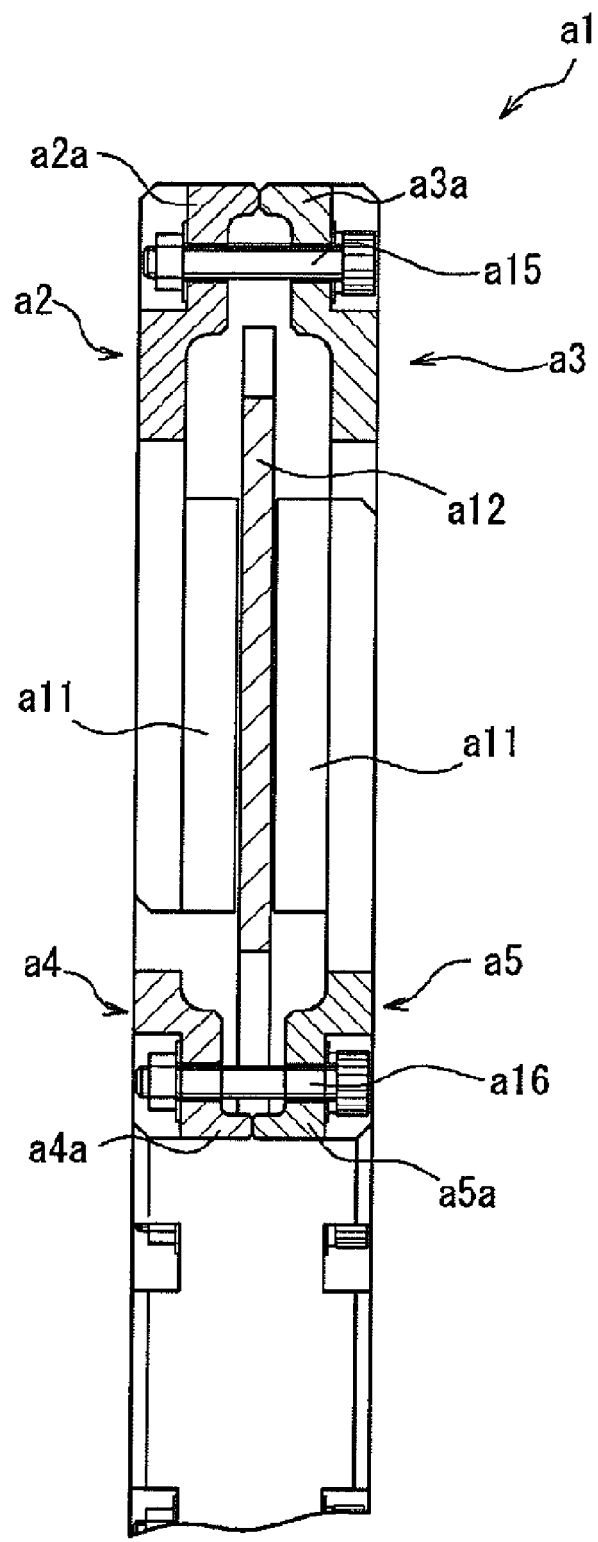
FIG. 4 is a sectional view of the eccentric thrust bearing assembly according to the one embodiment of the first aspect of the invention, taken on the line B-B is FIG. 3.

FIG. 3 is a front view showing an interior of a principal part of the bearing assembly in section on the line A-A in FIG. 2, the principal part excluding the second cage guide a12 (only a quadrant of the section is shown). FIG. 3 also shows the standard state, whereas the second cage guide a12 is depicted with the phantom line. FIG. 4 is a sectional view of the bearing assembly a1 in the standard state as taken on the line B-B in FIG. 3. As shown in FIG. 2 to FIG. 4, the first radially inside case a4 is disposed radially inwardly of the first radially outside case a2, while these inside and outside cases substantially have the same axial positions. Likewise, the second radially inside case a5 is disposed radially inwardly of the second radially outside case a3, while these inside and outside cases substantially have the same axial positions. Furthermore, as shown in FIG. 4, the first radially outside case a2 and the second radially outside case a3 are integrally interconnected by means of the screw a15 mounted in the vicinity of the outside ring portions a2a and a3a of these cases. On the other hand, the first radially inside case a4 and the second radially inside case a5 are integrally interconnected by means of a screw a16 mounted in the vicinity of the inside ring portions a4a and a5a of these cases. The screws a15 and a16 are mounted to plural places circumferentially arranged with equal spacing. Incidentally, FIG. 1 omits the delineation of the screws a15 and a16.

As shown in FIG. 1, the circumferential locations of the four outer races a6 mounted to the inward tongues a2b of the first radially outside case a2 and of the four inner races a7 in opposing relation therewith (the four inner races a7 mounted to the outward tongues a5b of the second radially inside case a5) are the first positions a21 separately located at four places. On the other hand, the circumferential locations of the four outer races a6 mounted to the inward tongues a3b of the second radially outside case a3 and of the four inner races a7 in opposing relation therewith (the four inner races a7 mounted to the outward tongues a4b of the first radially inside case a4) are the second positions a22 separately located at four places. As shown in FIG. 3, these first positions a21, the second positions a22 and the individual races are alternately arranged on the same circle a23 at circumferential angular intervals of α set to 45°, or at 45° circumferential phase shift relative to one another.

In this manner, the first position a21 and the second position a22 are shifted relative to each other, whereby an axial distance between the two ball-a8 rows of the bearing assembly of the conventional double-row structure may be decreased as much as possible. Thus, the bearing assembly may have a structure wherein the respective certain portions of all the balls a8 are present on the same plane. It is even possible to arrange the two rows of balls in a single ball row. In addition, the bearing assembly is adapted to bear the axial loads in the opposite directions without relying upon the double-row structure. In such an arrangement, the individual members corresponding to the members of the eccentric thrust bearing assembly of the conventional double-row structure may be alternately arranged along the circumferential direction, so as to be arranged in a single row. That is, the first radially outside case a2, the second radially inside case a5, the inner and outer races a7, a6 interposed between these cases, and the balls a8 may function as a first-row eccentric thrust bearing portion (1) of the conventional double-row bearing assembly, whereas the second radially outside case a3, the first radially inside case a4, the inner and outer races a7, a6 interposed between these cases, and the balls a8 may function as a second-row eccentric thrust bearing portion (2) of the conventional double-row bearing assembly. Since each pair of the radially outside cases a2, a3 and of the radially inside cases a4, a5 are integrally interconnected, the portion equivalent to the first-row eccentric thrust bearing portion (1) of the conventional double-row eccentric bearing assembly can bear the axial load in one direction, whereas the portion equivalent to the second-row eccentric thrust bearing portion (2) of the conventional double-row eccentric bearing assembly can bear the axial load in the other direction. In addition, because of such a single-row structure, the bearing assembly may have a smaller bearing width than that of the double-row structure. The eccentric thrust bearing assembly according to the first aspect of the invention is adapted for circumferential and radial movement within a decenterable range thereof. Hence, this bearing assembly is adapted for relative rotation within this movable range but does not permit the relative rotation beyond this range (relative rotation beyond a predetermined angular range).

The outer races a6 and inner races a7 as the disk-like members are individually disposed at the first positions a21 and the second positions a22. As shown in FIG. 2, each of the races a6, a7 is formed with a step a9 on its circumference, such that an axially outer side thereof defines a protrusion. On the other hand, each of the tongues is formed with a recess corresponding to the protrusion such that each of the races a6, a7 may be combined with each of the tongues a2b, a3b, a4b, a5b by mating the recess with the protrusion.

As shown in FIG. 2 and FIG. 3, a gap aK1 (represented by a hatched area in FIG. 3) is defined between an inner peripheral surface a3c of the second radially outside case a3 and an outer peripheral surface a5c of the second radially inside case a5, the gap extended along the overall length of the peripheral surfaces. As shown in FIG. 3, the gap aK1 has a width equal to a radial distance aL determined at the radial outermost point of the outward tongue a5b and a width equal to a radial distance aM determined at the radial innermost point of the inward tongue a3b. In order to substantially equalize the width of the gap aK1 along the overall length, the inner peripheral surface a3c of the second radially outside case a3 is configured to substantially conform to the configuration of the outer peripheral surface a5c of the second radially inside case a5. As a result, the width of the gap aK1 is in the range of aL or more and aM or less with respect to the overall length. In addition, the distance aM is decided in view of a sufficient strength of the radially inside cases a4, a5 as well. The distance aM may preferably be defined to be equal to the distance aL. The provision of the gap aK1 allows the second radially outside case a3 and the second radially inside case a5 to be disposed at the axially same position so that the balls a8 are arranged in a single row. Furthermore, the second radially inside case a5 and the second radially outside case a3 are allowed to move relative to each other substantially for the distance aL in every radial direction, and are also allowed to move circumferentially relative to each other (relative rotation). A distal end of the outward tongue a5b of the second radially inside case a5 is shaped like a semi-circle (FIG. 3), which corresponds to a circular shape of the inner race a7. In addition, such a shape of the outward tongue a5b is made for the sake of providing a relative movement stroke of the distance aL around a standard position of the ball a8, the relative movement stroke defined between the second radially inside case a5 and the second radially outside case a3. On the other hand, a distal end of the inward tongue a3b of the second radially outside case a3 is also shaped like a semi-circle, which corresponds to the shape of the outer race a6. In addition, such a shape of the inward tongue a3b is made for the sake of providing a relative movement stroke of the distance aL around the standard position of the ball a8, the relative movement stroke defined between the second radially inside case a5 and the second radially outside case a3. Thus, the range of the gap aK1 decides a relatively movable range between the radially inside case a5 and the radially outside case a3.

The ball a8 as the rolling element is allowed to move by a gap aK2 (FIG. 3) defining an annular area of a width aR about the ball a8, the gap disposed between an outside surface a10a of the cage a10 accommodating the ball therein and an inside surface a11a of the first cage guide a11. That is, the ball a8 is allowed to move till the outside surface a10a of the cage a10 comes into contact with the inside surface a11a of the first cage guide a11. In this embodiment, the movable range of the ball a8 is decided by the area (diameter) of the races a6, a7, the diameters of the ball a8 and of the cage a10 and the inside diameter of the first cage guide a11. Thus, the range of the gap aK2 decides the movable range of the ball a8.

According to the embodiment, the space distance aR between the outside surface a10a of the cage a10 accommodating the ball a8 and the inside surface a11a of the first cage guide a11 (the radial space distance aR in the standard state) is defined to be a half of the aforesaid space distance aL. That is, the following mathematical equation holds:

$aL=2(aR)$.

Such an equation corresponds to that the moving distance of the ball a8 is a half of the relative movement distance between the races. The diameter of the inner race a6 and the outer race a7 is so defined as to set the distance aR to a half of the distance aL.

In this manner, the relatively movable range between the second radially inside case a5 and the second radially outside case a3, as provided by the gap aK1 therebetween, substantially corresponds to the movable range of the ball a8, which is provided by the gap aK2 between the outside surface a10a of the cage a10 and the inside surface a11a of the first cage guide a11. In other words, the relatively movable range between the radially inside and outside cases a5, a3, as provided by the gap aK1 therebetween, substantially coincides with the decenterable range of the bearing assembly a1. Specifically, when the ball a8 is moved so far as to bring the outside surface a10a of the cage a10 accommodating the ball a8 into abutment against the inside surface a11a of the first cage guide a11, the second radially inside case a5 is also brought into substantial abutment against the second radially outside case a3 so that an excessive space therebetween is minimized. Accordingly, the bearing assembly a1 may be downsized while expanding the decenterable range thereof to a maximum limit.

To eliminate the excessive space around the ball a8 also means that the races a6, a7 are not unduly increased in size. Therefore, the greatest possible decenterable range may be obtained using the small races a6, a7. As shown in FIG. 2, a gap a5 between an outer peripheral surface of the second cage guide a12 and inner peripheral surfaces of the outside ring portions a2a, a3a of the two radially outside cases is slightly greater than the aforesaid space distance aR, such that the second cage guide and the radially outside cases may be kept out of contact with each other with respect to the decenterable range of the bearing assembly a1.

According to the embodiment, all the outer races a6 and inner races a7 are formed of the disks having the same diameter and the same configuration. Furthermore, all the races are disposed on the same circle a23 in the standard state (FIG. 3). Hence, the respective movable ranges of the balls a8 at all the locations, or at all the first positions a21 and the second positions a22, correspond to the decenterable range of the bearing assembly a1. That is, the bearing assembly a1 is arranged such that when the bearing assembly a1 is moved to the limit of the decenterable range thereof with respect to every direction of a movable plane, every one of the balls a8 is moved almost to the limit of the movable range thereof. In short, all the inner and outer races a6, a7 are standardized by using the same member and besides, the size of the races is minimized.

While the description has been made by way of example of the relation between the second radially outside case a3 and the second radially inside case a5, the first radially outside case a2 and the first radially inside case a4 also have the same relation.

The following method may be taken to position the ball a8 at the center of the outer races a6 and the inner races a7 in the standard state, as shown in FIG. 2. After the bearing assembly a1 is assembled, the bearing assembly a1 under a small preload may be subjected to the maximum relative movement in every radial direction and circumferential direction. In this method, any cage a10 retaining a displaced ball a8 is brought into contact against the first cage guide a11 so as to cause the ball a8 to slide on the race, whereby the position of the ball a8 is adjusted to the center of the outer and inner races a6, a7 in the standard state. Thus, the provision of the first cage guide a11 facilitates the positional adjustment of the balls a8. Particularly in a state where the bearing assembly a1 is assembled, the positions of the balls a8 may be readily adjusted.

In a case where the bearing assembly a1 is used as an assemble member mounted to a device other than the bearing assembly a1, which is provided with means using, for example, rubber, spring or the like for restricting the range of the relative movement in the bearing assembly a1, if a range restricted by the above means is smaller than the decenterable range of the bearing assembly a1, the bearing assembly a1 does not encounter interference with the components of the device.

While the configuration of the outer race a6 and the inner race a7 is not particularly limited, the embodiment adopts a separate-race structure wherein these races a6, a7 are separately located at the first positions a21 and the second positions a22. Such a structure reduces the race portion which is in rolling contact with the balls a8 and which is normally formed from the iron-base material such as a bearing steel. This leads to cost reduction. On the other hand, the radially inside cases a4, a5 and the radially outside cases a2, a3 retaining these races a6, a7 for integrally interconnecting these races do not contact the balls a8 and hence, these cases may be formed from a light metal such as an aluminum alloy. Accordingly, such a separate-race structure is preferred because the individual races a6, a7 may be downsized while the bearing assembly a1 may be reduced in weight. In general tendency, when the bearing assembly is increased in size, the races a6, a7 are also increased in size. The races increased in size make it quite difficult to machine the raceway surfaces having high flatness. If the race is separated as suggested by the embodiment, it is easy to increase the size of the whole body of the bearing assembly wherein the individual races are downsized.

It is noted here that the respective groups of the first positions a21 and the second positions a22 are located at four places, or otherwise at three or more places. Furthermore, these three or more places are not disposed on a straight line but along the circumferential direction, so that the two pairs of radially inside cases a4, at and the radially outside cases a2, a3 in opposing relation via the balls a8 are individually supported on three or more points. This allows the bearing assembly to bear not only the axial loads in the opposite directions but also the moment load. Therefore, each group of the first positions a21 and the second positions a22 may be located at three or more places but not limited to the example of the embodiment where the respective groups of the first positions a21 and the second positions a22 are located at four places. It is more preferred, as suggested by the embodiment, that the first positions a21 and the second positions a22 are distributed in a circumferential angular range of 180° or more, in order not that the three or more locations of the respective groups of the first positions a21 and the second positions a22 are centralized in a circumferential angular range of 180° or less. Such an arrangement is preferred because the support points on the opposite planes are more widely distributed along the circumferential direction, so that the bearing assembly is able to bear a greater moment load and that the axial load may be more evenly distributed in the plane thereby subjecting the balls a8 to more even loads.

According to the embodiment, the respective groups of the first positions a21 and the second positions a22 are located at the same number of N places (N indicating an integer of 3 or more). Furthermore, the first positions a21 and the second positions a22 are alternately arranged on the same circle a23 at (360/2N)° circumferential phase shift relative to one another. In such an arrangement, the first positions a21 and the second positions a22 are located as evenly distributed along the circumferential direction and the radial direction. Thus, the bearing assembly is adapted for efficient bearing of the axial loads in the opposite directions and of the moment load.

Furthermore, the movable ranges of the individual balls a8 are the same in this case. This permits the all of the races a6, a7 to have the minimum size and the same configuration, so that the bearing assembly a1 may be further reduced in weight. Although N may preferably be an integer of 3 or more, an excessively large number of N leads to a tendency that a space distance between members that provides the decenterable range of the bearing assembly is too small and that the structure of the bearing assembly is complicated because of too many components. Therefore, it is normally preferred to define the value N in the range of 4 to 6. The value N may more preferably be 5 from the viewpoint of balance between the moment load bearing ability and the decenterable range of the bearing assembly.

In the first aspect of the invention, the cages a10 need not necessarily be provided. However, if the cages a10 for accommodating the balls a8 are used, as suggested by the embodiment, the leakage of a lubricant such as a lubricating oil or grease supplied to the peripheries of the balls a8 may be avoided. While the first cage guides a11 facilitate the positional adjustment of the balls a8 as described above, a more positive positional adjustment may be accomplished by using the cages a10 in combination with the first cage guides a11. That is, the abutment between the outside surface of the cage a10 and the inside surface of the first cage guide a11 may assuredly bring the ball a8 into sliding movement during the positional adjustment. In addition, the first cage guide a11 is able to prevent the invasion of foreign substances into an area around the races a6, a7 or between the races, also functioning as a seal member for the whole body of the bearing assembly.

Because of the combined use of the cages a10 and the second cage guide a12, the relative positional relation among the individual balls a8 can be maintained although the second cage guide a12 has a relatively small thickness. Since the cages a10 are received by the cage insertion holes a12a of the second cage guide a12, the balls a8 may be assuredly retained although the second cage guide a12 is not nearly as thick as the diameter of the ball a8. The cage a10 may be formed from a resin such as a phenol resin, whereas the second cage guide a12 may be formed from a resin such as polytetrafluoroethylene (PTFE). The first cage guide a11 may be formed from a resin material or the like. However, the first cage guide is required to bring the ball a8 into sliding movement as bearing against the pressing force of the ball a8 in the aforementioned case where the first cage guide a11 is used for the positional adjustment of the ball a8. Therefore, a material having a certain level of high rigidity is more preferred as the material for the first cage guide. A suitable material may be exemplified by an aluminum alloy.

The rolling element may have any configuration. However, all the rolling elements may preferably be the balls a8 as illustrated by the embodiment in that the bearing assembly is reduced in rolling resistance with respect to every direction of the raceway surface. Furthermore, the number of rolling elements is not particularly limited. A plural number of rolling elements may be disposed at each of the first positions or the second positions. Otherwise, one rolling element may be disposed at each of the first or second positions, as illustrated by the embodiment. At least one rolling element must be disposed at each of the positions.

The bearing assembly according to the first aspect of the invention may be provided with a shield on an axial side thereof. The shield covers one side or the opposite sides of the bearing assembly, thereby usefully preventing the invasion of foreign substances into the bearing assembly as well as the leakage of the lubricant. It is preferred that the shield is so disposed as not to limit the decenterable range of the bearing assembly. For instance, the shield may consist of an inner shield formed of a donut-shaped disk which is mounted to the inside ring portion of the radially inside case and extended radially outwardly therefrom; and an outer shield formed of a donut-shaped disk which is mounted to the outside ring portion of the radially outside case and extended radially inwardly therefrom. In this case, these inner and outer shields are disposed in alignment in the standard state and are axially overlapped on each other (for example, the outer shield is overlapped on an axially outer side of the inner shield). A layer-like space between the overlapped shields is decreased as much as possible in order to ensure anti-dust performance. An outside diameter and an inside diameter of the outer shield are defined to be greater than those of the inner shield by at least a relatively movable distance therebetween (equivalent to the distance aL according to the embodiment), such as not to limit the decenterable range of the bearing assembly. In order to retain the aforementioned relative positional relation between the members in the standard state, the pre-load may preferably be applied between the inside and outside members by means of a pre-load applying screw or the like, thereby obviating the sliding movement between the rolling elements and the races.

In the bearing assembly according to the first aspect of the invention, the configuration of the radially outside member or the radially inside member is not limited to the circular shape (ring-like shape), but may be a polygonal shape, for example. In a case where the above member has the polygonal shape, the radial direction and the circumferential direction herein means a radial direction and a circumferential direction of a circle circumscribed about the polygonal shape.

While the foregoing embodiment illustrates the single-row bearing assembly wherein all the balls a8 have their centers positioned on the same plane, it goes without saying that the first aspect of the invention is not limited to such a single-row structure. In other words, what is required is that the respective certain portions of the rolling elements are present on the same plane. So long as this condition is satisfied, the rolling elements may be axially displaced relative to one another. The bearing assembly of the conventional double-row structure has a great axial thickness because at least the race must exist in an axial gap between the rows of rolling elements.

In the first aspect of the invention as described above, the constitution is made such that the individual members corresponding to those constituting the bearing assembly of the conventional double-row structure are alternately disposed while the respective certain portions of the rolling elements have their certain parts are present on the same plane. Thus, the first aspect of the invention may provide the eccentric thrust bearing assembly capable of bearing the axial loads in the opposite directions and having a smaller bearing width than that of the double-row structure.

An embodiment according to a second aspect of the invention will hereinbelow be described with reference to the drawings.

Figure 5:
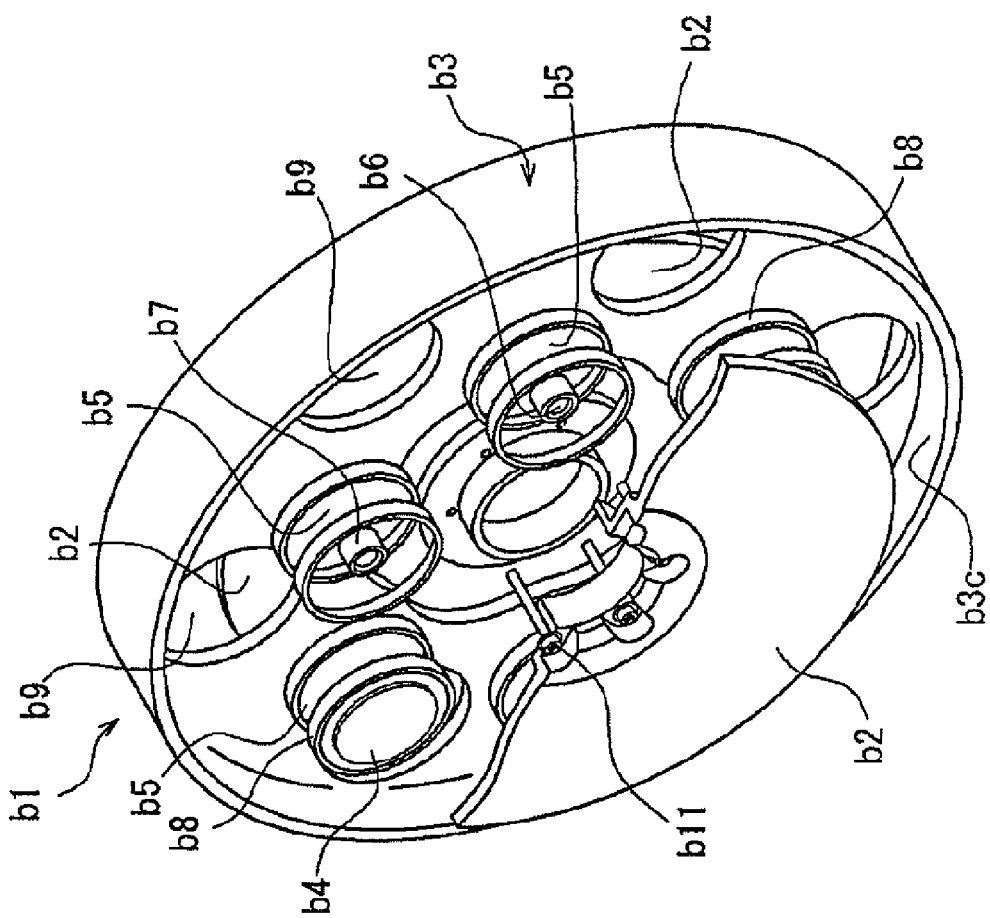
FIG. 5 is a (partly cut-away) perspective view showing a bearing assembly according to an embodiment of a second aspect of the invention.
Figure 6:
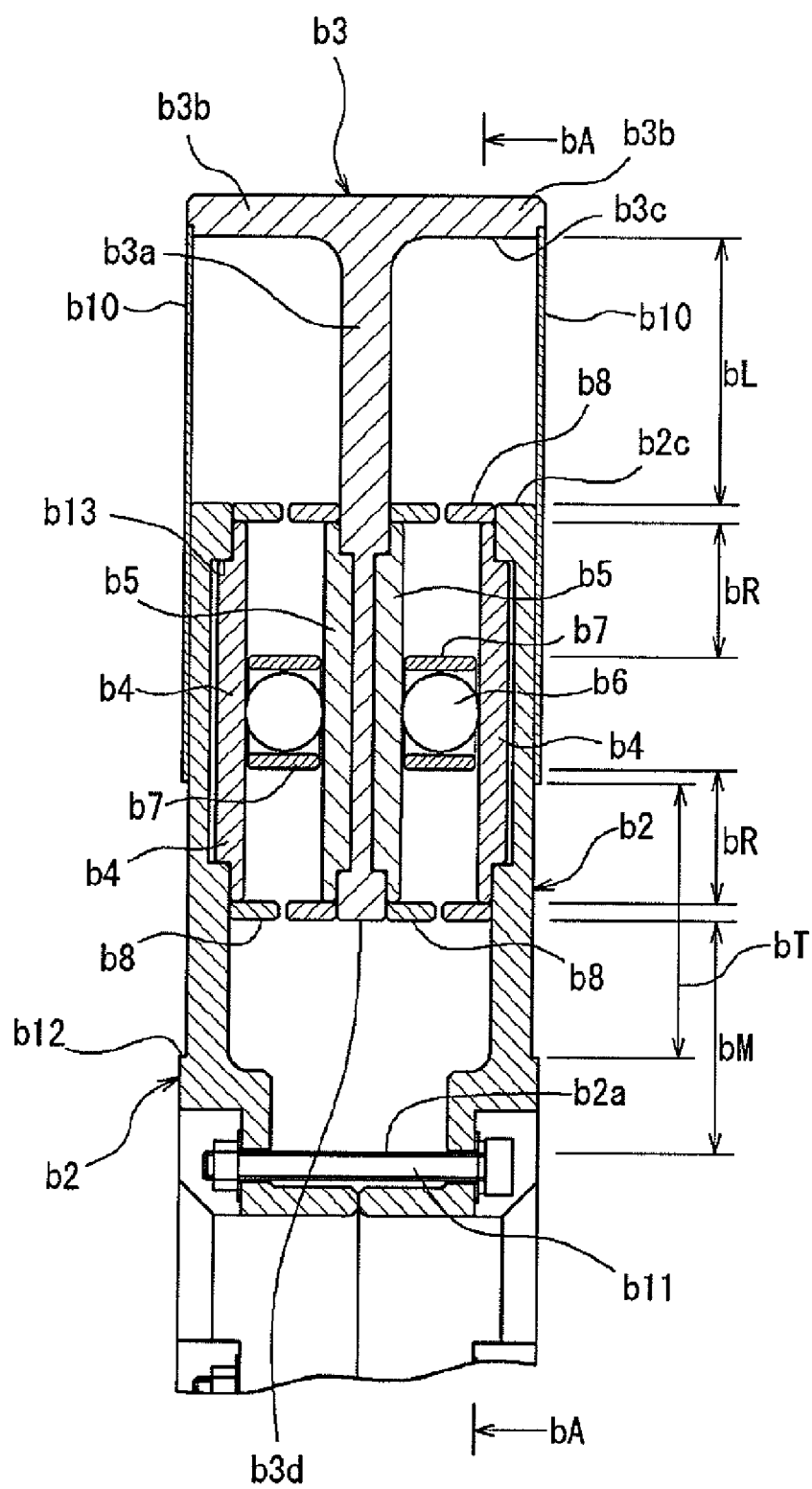
FIG. 6 is a sectional view of the bearing assembly according to the embodiment of the second aspect of the invention.
Figure 7:
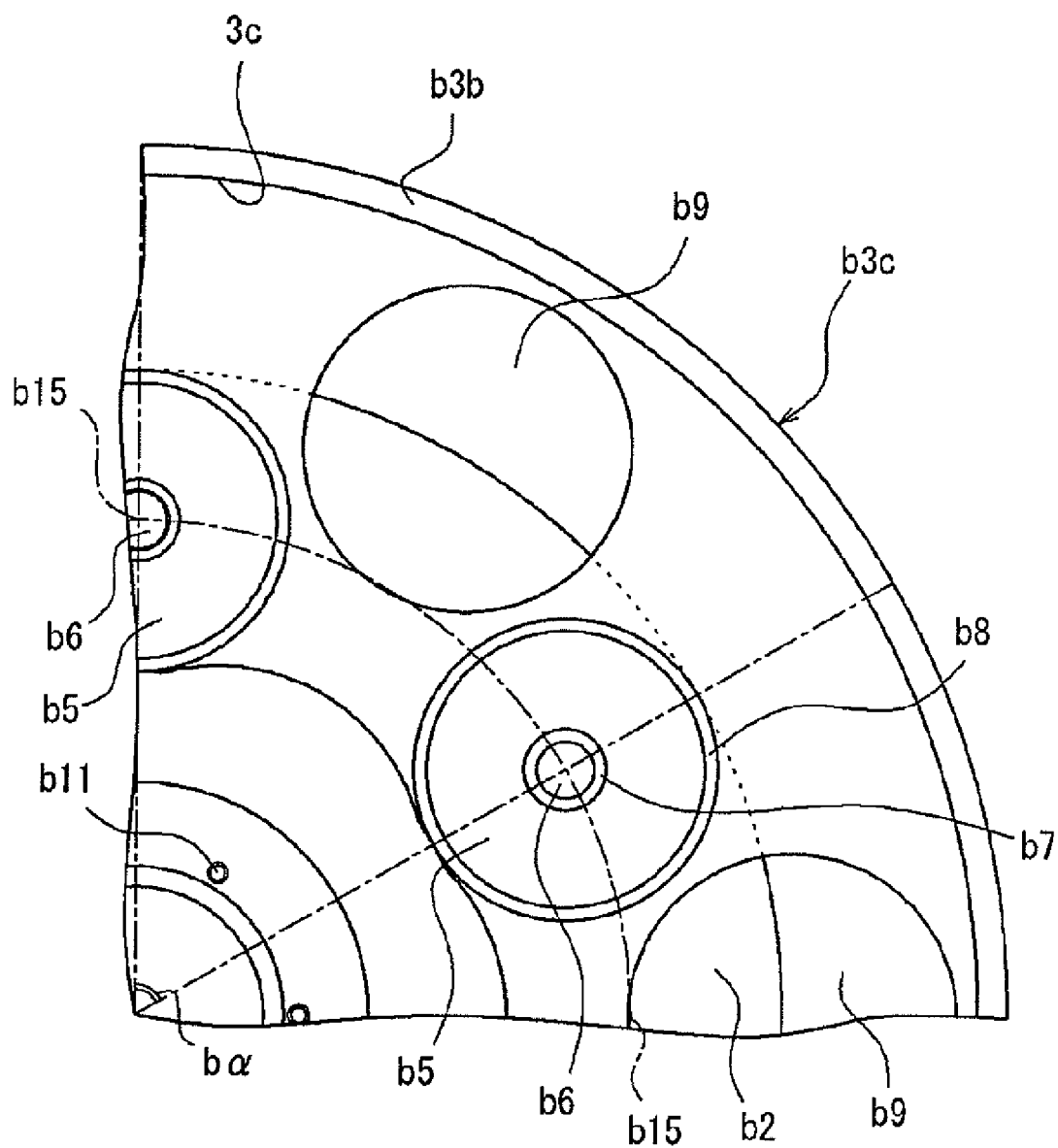
FIG. 7 is a front view showing a principal part of the bearing assembly according to the embodiment of the second aspect of the invention as viewed along the arrows from the section on the line A-A in FIG. 6.

FIG. 5 is a perspective view showing a bearing assembly b1 according to the embodiment of the invention. FIG. 6 is a sectional view of the bearing assembly b1 (the lower half from its axis is omitted), a circumferential position of which is defined as a position on a line passing through the center of a ball b6 as the rolling element. FIG. 7 a front view showing a principal part (quadrant) of the bearing assembly as viewed along the arrows from section on the line A-A in FIG. 6.

As shown in FIG. 5 and FIG. 6, the bearing assembly b1 includes: two annular axially outside cases b2, b2 disposed in axially opposing relation; and an annular axially inside case b3 interposed between these two axially outside cases b2, b2. Thus, the two axially outside cases b2, b2 opposes the axially opposite sides of the axially inside case b3, respectively. The two axially outside cases have the same configuration and confronts the axially inside case b3 as symmetrically oriented thereto. Furthermore, the axially outside cases are integrally interconnected at places adjacent the inside circumferences thereof by means of plural screws b11 circumferentially arranged with equal spacing. Six circular inner races b5 are mounted to each of the both sides (confronting the axially outside cases) of the axially inside case 3, which oppose a respective inner side of the axially outside cases 2, 2. These inner races b5 are separately located at places of the same PCD (on the same circle) on each of the opposing sides (the both sides) of the axially inside case b3 to the respective opposing side of the axially outside cases, at regular circumferential intervals (or at circumferential angular intervals of 60°). On the other hand, six circular outer races b4 are separately located on the respective inner side of the two axially outside cases b2. These outer races b4 are separately located at places of the same PCD (on the same circle) on each of the inner sides of the axially outside cases b2, at regular circumferential intervals (or at circumferential angular intervals of 60°). All the outer races b5 and inner races b4 have a circular shape of the same diameter.

In FIG. 5, for the sake of easy view of the arrangement of the individual members, the upper semi-circular part of the axially outside case b2 is cut away while the outer races b4 mounted to the cut-away part is accordingly omitted. In addition, the axially outside case b2 is shifted downwardly and rearwardly relative to the axially inside case b3 as seen in the figure. The figure also omits a shield b10 (to be described hereinlater) partly covering an outer side of the axially outside case (FIG. 6). Unlike FIG. 5, FIG. 6 and FIG. 7 are the sectional views showing a neutral state (hereinafter, also referred to as "standard state") of the bearing assembly wherein the balls b6 are not moved in any direction.

As shown in FIG. 6, each inner race b5 and each outer race b4 axially oppose each other as disposed at corresponding positions in the standard state. Furthermore, the inner races b5 are disposed at the same positions (phase) with respect to the front and rear sides (the opposing sides to the respective axially outside cases) of the axially inside case b3. Therefore, the outer races b4 are also disposed at the same positions (phase) with respect to the two axially outside cases b2, b2. As shown in FIG. 6 and FIG. 5, each of the disk-like inner and outer races b4, b5 is formed with a race step b13 on its circumference, such that an axially outer side thereof defines a protrusion. On the other hand, each of the axially outside cases b2 and the axially inside case b3 is formed with a recess corresponding to the protrusion. The outer races and inner races b4, b5 are mounted to the axially outside cases b2 and the axially inside case b3 by combining together these protrusions and recesses.

In the standard state, the ball b6 as the rolling element is disposed at the center of each circular inner race and outer race b5, b6. A total number of 12 balls b6 are used in one-to-one correspondence the inner races and outer races, so as to constitute a double-row bearing assembly wherein the balls are arranged in two rows on the same plane, each row consisting of six balls. Each ball b6 is accommodated in a cylindrical cage b7, whereas a ring-like cage guide b8 is fitted about each of the inner races b5 and outer races b4. The cage guide b8 projects toward the ball b6 from a raceway surface of each of the inner and outer races b4, b5. The cage guide b8 facilitates the positioning of the ball b6 centrally of each circular inner or outer race b5, b4 in the standard state. That is, when the bearing assembly b1 under a small pre-load is subjected to the maximum relative movement with respect to every radial direction (the overall circumference), any displaced rolling element may be locked by the cage guide b8 and adjusted into position as properly slid on the race. Thus, the cage guides b8 permit the individual balls b6 to be adjusted into position quite easily in the assembled state of the bearing assembly b1.

Since the inner and outer races b4, b5 are separately located at the respective positions of the balls b6, the individual races may be reduced in size as compared with a case where the races are not separated. The races reduced in size are easy to machine and hence, it becomes easy to fabricate larger bearing assemblies. Furthermore, the bearing assembly may be reduced in weight because the race portions in contact with the balls b6 are formed from the iron-base metal such as a bearing steel, whereas the axially inside case and the axially outside cases may be formed from the light metal such as an aluminum alloy.

In the standard state, all the inner and outer races b4, b5 are disposed on the same circle b15 (FIG. 7), thus having the same PCD. In addition, the races are distributed at equal circumferential angular intervals bα (FIG. 7). This embodiment defines the angular interval bα to be 60°. In such an arrangement, the balls b6 serving as the support points of the bearing assembly b1 are uniformly distributed in the circumferential direction and the radial direction. Hence, the bearing assembly is adapted to bear the axial loads in the opposite directions and the moment load in a more stable manner, while the loads on the individual balls b6 as the rolling elements may be equalized.

In the standard state, all the inner and outer races b4, b5 are disposed on the same circle b15 (FIG. 7), thus having the same PCD. In addition, all the inner and outer races b4, b5 have the circular shape of the same diameter. Therefore, the movable ranges of the balls b6 between the individual pairs of separately located inner and outer races b4, b5 are all equal to one another. That is, when any one of the balls b6 is moved across its movable range, all the other balls b6 are also moved across their movable ranges. Thus, the embodiment minimizes the sizes of the all of the plural inner and outer races b4, b5.

According to the embodiment, the axially outside cases b2 and the axially inside case b3 are all shaped like a ring and coaxially arranged. Hence, a gap between a flange inner periphery b3c and an outer periphery b2c of the axially outside case b2 defines a ring form having a constant width with respect to the overall circumference thereof. In addition, the movable range of each ball b6 is defined by a circular area corresponding to the circular shape of the inner and outer races b4, b5. Therefore, this bearing assembly b1 allows for the relative movement by a constant width with respect to every direction of the movable plane. Furthermore, the bearing assembly b1 has a uniform structure with respect to the circumferential direction. Since all the inner and outer races b4 b5 have the circular shape of the same diameter, all the inner and outer races b4, b5 are standardized by using the same race member as the inner and outer races b4, b5.

The axially inside case b3 is formed with flanges b3b, b3b on an outside circumference thereof, the flanges extended from a substantially plate-like base b3a in axially opposite directions (FIG. 6). The annular shield b10 is attached to an axially distal end of each of the flanges b3b, b3b, the shield extending radially inwardly from the distal end. The shield b10 is formed of a thin annular plate and is axially positioned to overlap the outer side of the axially outside case b2 as substantially defining no clearance therebetween. The shield b10 is fixed to the axially distal end of the flange b3b of the axially inside case b3 but is not fixed to the axially outside case b2. Therefore, the shield b10 is allowed to move relative to the axially outside case b2 as maintaining the clearance-free overlapping relation with the outer side of the axially outside case. Thus, the shield is useful for preventing the invasion of foreign substances into the bearing assembly b1. The axially distal end of flange b3b is substantially aligned with the axial position of the outer side of the axially outside case b2, thereby permitting the mounting of the shield b10.

Since the axially distal end of flange b3b of the axially inside case b3 is substantially aligned with the axial position of the outer side of the axially outside case b2, the flange inner periphery b3c as an inner peripheral surface of the flange b3b of the axially inside case b3 and the outer periphery b2c of the axially outside case b2 have portions in radially opposing relation. Therefore, the flange and the axially outside case are in such a positional relation that these members possibly contact with each other when the distance of the relative movement in the bearing assembly is increased. In the standard state as shown in FIG. 6, a radial space distance bL exists between the flange inner periphery b3c and the outer periphery b2c of the axially outside case b2 along the overall circumference. Furthermore, an inner periphery b3d of the annular axially inside case b3, or the radially innermost side thereof, and an outer periphery b2a of the interconnection of the axially outside cases b2 are also in such a relation that these members possibly contact with each other when the distance of the relative movement in the bearing assembly is increased. In the standard state as shown in FIG. 6, a radial space distance bM exists between these members along the overall circumference. The distance bM is substantially equal to the aforesaid distance bL, but is slightly greater than the distance bL by an allowance for forming a bolt hole through which the screw b11 is inserted. These gaps between the axially inside case and the axially outside case provides the relatively movable range.

In the standard state as shown in FIG. 6, a gap of a width bR exists between an outer periphery of the cage b7 accommodating the ball b6 and an inner periphery of the cage guide b8 fitted about the race, the gap extending along the overall circumference about the ball b6. The range of the gap decides the movable range of the ball b6 as the rolling element. That is, the diameter of the inner race b5 and the outer race b4, the outside diameters of the ball b6 and the cage b7, the inside diameter of the cage guide b8 and the like are the determinant factors of the movable range of the ball b6 as the rolling element.

The embodiment defines the above space distance bR to be a half of the above distance bL. That is, the following equation holds:

$$bL = 2(bR).$$

The equation corresponds to that the moving distance of the ball is a half of the distance of the relative movement between the races. According to the embodiment, the movable range of each ball b6 between each pair of separately disposed inner and outer races b4, b5 substantially corresponds to the aforementioned relatively movable range provided by the gap between the axially outside case b2 and the axially inside case b3. As a result, the decenterable range of the bearing assembly 1 substantially coincides with the relatively movable range provided by the gap between the axially outside case b2 and the axially inside case b3. In such an arrangement, when the axially outside cases b2 and the axially inside case b3 are relatively moved so far as to reduce the space distance bL to zero, the balls b6 are moved so far as to reduce the space distance bR to zero. Thus, an excessive space is excluded from the gap between the outer periphery b2c of the axially outside case b2 and the axially inside case b3, while an excessive space is also excluded from the gap between the inner and outer races allowing for the movement of the ball. As a result, the bearing assembly b1 can accomplish the size reduction.

The embodiment defines the distance bL to be substantially equal to the distance bM. Therefore, when the axially inside case b3 and the axially outside cases b2 are relatively moved so far in one radial direction as to reduce the distance bL to zero, the distance bM with respect to the radial direction is substantially reduced to zero, as well. In a case where there is a great difference between the space distance bL and the space distance bM, the smaller one of these space distances limits the decenterable range of the bearing assembly b1. However, the embodiment substantially equalizes these space distances, thereby accomplishing the size reduction of the bearing assembly b1 and also providing the greatest or the greatest possible decenterable range of the bearing assembly b1. Furthermore, the distance bM may be decreased so that the annular axially outside case b3 may have an increased inside diameter. Thus, the bearing assembly b1 may be further reduced in weight.

According to the embodiment, the axially inside case b3 is formed with circular through holes b9 at places free from the inner races b5. The provision of such through holes b9 further reduces the weight of the axially inside case b3, resulting in the further reduction of the weight of the bearing assembly b1. In this embodiment, all the inner and outer races b4, b5 are disposed on the same circle b15 (FIG. 7) so as to have the same PCD, and are distributed with equal circumferential spacing. Accordingly, the through holes b9 are also arranged on the same circle and with equal circumferential spacing. In addition, all the through holes b9 have the same diameter. Such a design allows the through holes b9 to be disposed at places free from the inner races b5 and distributed with equal circumferential and radial spacing. Hence, the axially inside case b3 may have a uniform rigidity with respect to the circumferential direction and may also be reduced in weight.

The embodiment devices the shield b10 of the substantially donut-shaped disk so as not to decrease the decenterable range of the bearing assembly b1. Specifically, as shown in FIG. 6, a radial distance bT from an inside circumference of the shield b10 to a shield-dedicated step b12 formed in the vicinity of a radially inner side of the axial outside case b2 is defined to be greater than the aforesaid distance bL. In such an arrangement, the decenterable range of the bearing assembly b1 is not limited by the shield b10. A depth of the shield-dedicated step b12 is substantially equal to a thickness of the shield b10, so that the bearing assembly b1 may not have a greater axial thickness than necessary.

The following method may be taken to position the respective balls b6 at the center of the inner and outer races b4, b5 in the standard state, as shown in FIG. 6. That is, the bearing assembly b1 may be subjected to the maximum relative movement to the limit of the overall decenterable range of the bearing assembly b1 in a state where a small pre-load is applied between the axially outside case b2 and the axially inside case b3 by means of the pre-load applying screws or the like. According to this method, any displaced ball b6 may be slidably moved by the cage guide b8 so as to be adjusted into position. Subsequently, the pre-load applying screws may be fastened with a predetermined torque. According to the second aspect of the invention, it is preferred that the rolling elements such as the balls b6 at the respective locations are positioned centrally of the inner and outer races b4, b5 in the standard state without varying the respective PCD (Pitch Circle Diameter). However, the axial load or the like may cause the rolling elements to be subjected to the unbalanced load, which may act to lift up some of the balls 6 from the races so that the lifted balls may be displaced. In this case, as well, the cage guides b8 may be provided thereby allowing the individual balls b6 to be corrected for position in the state where the bearing assembly b1 is assembled, as described above. In order to maintain the PCD of the respective balls b6 in the standard state, the sliding movement between the respective balls b6, as the rolling elements, and the inner and outer races b4, b5 may be inhibited by applying the pre-load between the inside and outside members by means of the pre-load applying screws or the like.

In the second aspect of the invention, the cages b7 and cage guides b8 need not necessarily be provided. However, if the cages b7 for accommodating the balls b6 are used, as suggested by the embodiment, the leakage of the lubricant such as a lubricating oil or grease supplied to the peripheries of the rolling elements may be avoided. While the cage guides b8 facilitate the positional adjustment of the balls a6 as described above, a more positive positional adjustment may be accomplished by adding the cages b7. That is, the abutment between an outside surface of the cage b7 and an inside surface of the cage guide b8 assuredly brings the ball a8 into sliding movement during the positional adjustment. In addition, the cage guide b8 also serves to prevent the invasion of foreign substances into space between the races b4, b5 in opposing relation.

According to the second aspect of the invention, the rolling element may have any configuration. However, all the rolling elements may preferably be the balls b6 in that the bearing assembly is reduced in the rolling resistance with respect to every direction of the raceway surface. Furthermore, the number of rolling elements is not particularly limited. A plural number of rolling elements may be provided at each pair of the inner and outer races b4, b5. Otherwise, one rolling element may be provided at each pair of the inner and outer races b4, b5, as illustrated by the embodiment. At least one rolling element must be provided at each pair of the inner and outer races b4, b5.

In the second aspect of the invention, the outer or inner races b4, b5 are disposed on each of the axially outside cases b2 or on the axially inside case b3 on each of its opposing sides to the axially outside cases b2, as separately located at three or more places along the circumferential direction. In a case where, as illustrated by the embodiment, the separate inner races b5 are disposed on the axially inside case b3 on each of its opposing sides to the two axially outside cases but not in a manner that the both sides of the inner race b3 serve as the an inner race on the front side and an inner race on the back side of the axially inside case b3 at corresponding positions with respect to the both sides of the axially outside cases, six or more inner races b5 in total are necessary. Since the rolling elements such as the balls b6 are clamped between the respective pairs of the inner and outer races b4, b5, the axially inside case b3 and the axially outside cases b2 are each supported on three or more points along the circumferential direction. Hence, the bearing assembly is adapted to bear the axial loads in the opposite directions and the moment load in a stable manner.

While the inner and outer races b4, b5 and the balls b6 of this embodiment are distributed along the overall circumferential length, the second aspect of the invention is not limited to such a constitution. However, the bearing assembly is adapted to bear the axial loads and the moment load in a more stable manner if the outer or inner races b4, b5 are distributed at three or more places in a circumferential range of a circumferential angle of 180° or more (semi-circle), with respect to the inner side of each of the axially outside cases b2, b2 or to each of the opposing sides of the axially inside case b3 to the respective opposing axially outside cases b3. Such an embodiment is particularly preferred from the viewpoint of bearing a great moment load.

According to the embodiment, the outer or inner races b4, b5 are disposed at six places on each of the axially outside cases b2 or on either side of the axially inside case b2. Particularly, in a case where all the outer and inner races b4, b5 are positioned at the same PCD (on the same circle on the plane shown in FIG. 7) and arranged with equal circumferential spacing, as illustrated by the embodiment, it is preferred that three to eight outer or inner races b4, b5 are separately disposed on each of the axially outside cases b2 and on either side of the axially inside case b3. If two or less races are provided, the axially outside case b2 may not be supported stably. If too many races are provided, the individual races have such a small size that the movable range of the rolling element may become too small. In addition, the number of members is increased so much that the structure of the bearing assembly is complicated, leading to cost increase.

The embodiment defines the distance bL to be twice the distance bR, and also defines the distance bM to be substantially twice the distance bR. If the distance bL is defined to be substantially twice the distance bR while the distance bM is not substantially twice the distance bR, the movable range of each ball b6 substantially corresponds to the decenterable range of the bearing assembly b1, so that each of the outer and inner races b4, b5 may have the minimized size. In addition, the axially inside case b3 may have the minimized inside diameter.

In this embodiment as shown in FIG. 6, the inner races b5, b5 disposed on the axially inside case b3 on its opposing sides to the respective axially outside cases are placed at the corresponding positions (the same phase) on the front and back sides of the axially inside case b3. Accordingly, the outer races b4 disposed on the two axially outside cases b2, b2 in opposing relation with the respective inner races b5, b5 are also placed at the corresponding positions (the same phase) to those of the inner races b5, b5 in the standard state. However, the second aspect of the invention is not limited to such a constitution. The positions (phase) of the inner races b5 on the front and back sides of the axially inside case b3 may be shifted from each other.

In a case where the bearing assembly b1 is used as an assemble member mounted to an external device other than the bearing assembly b1, which is provided with means using, for example, a reaction force of rubber, spring or the like for restricting the range of the relative movement in the bearing assembly b1, if a range restricted by the above means is smaller than the decenterable range of the bearing assembly b1, the bearing assembly b1 does not encounter interference with the components of the device.

According to the bearing assembly of the second aspect of the invention, the configuration of the axially outside case or the axially inside case is not limited to a circular shape (ring-like shape) but may be a polygonal shape, for example. In a case where the above member has the polygonal shape, the radial direction and the circumferential direction herein means a radial direction and a circumferential direction of a circle circumscribed about the polygonal shape.

As described above, the second aspect of the invention may provide the double-row eccentric thrust bearing assembly which permits the downsizing of the race portions and which is easy to increase the size thereof but to decrease the weight thereof.

An embodiment according to a third aspect of the invention will hereinbelow be described with reference to the drawings.

Figure 8:
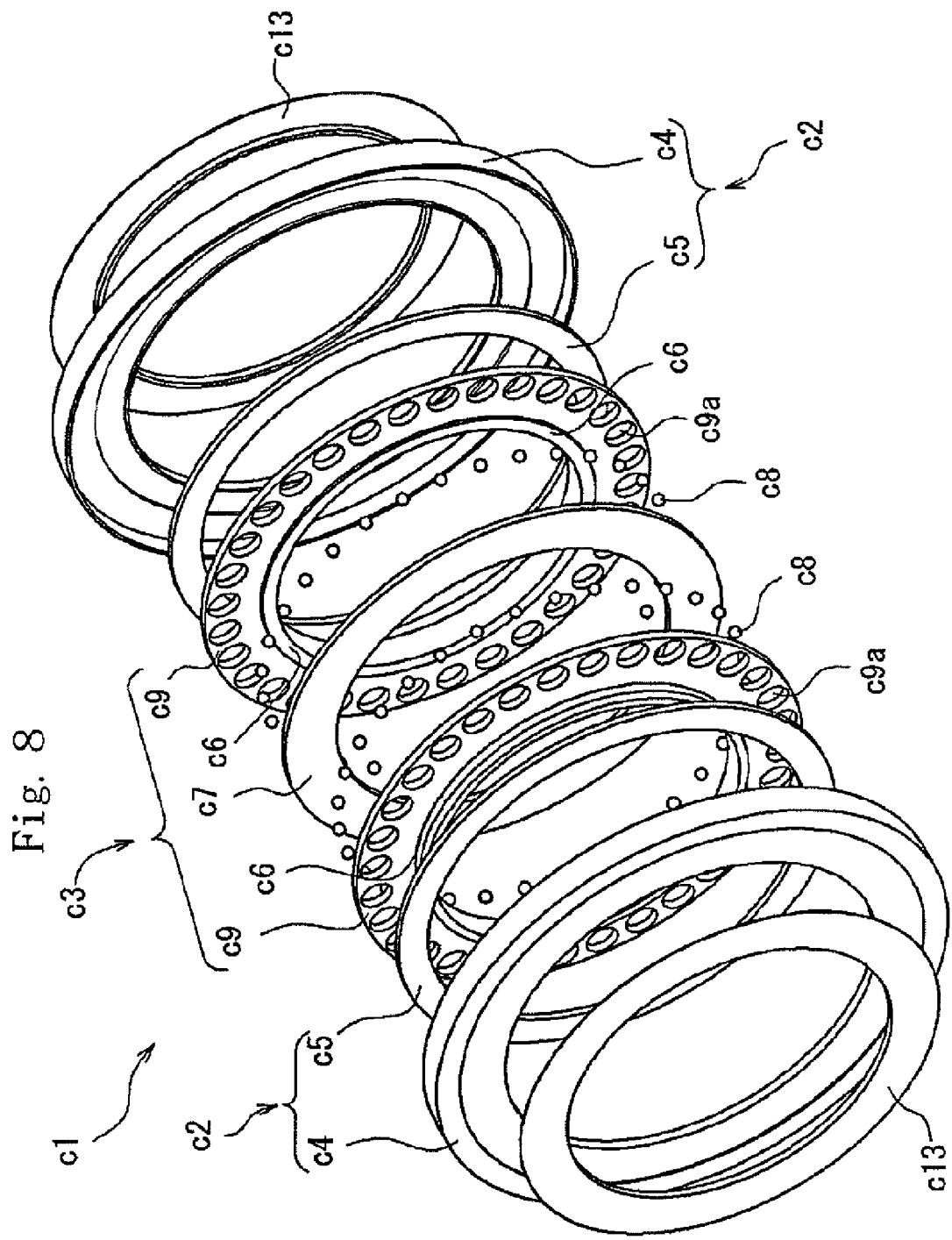
FIG. 8 is an exploded perspective view showing an eccentric thrust bearing assembly according to a first embodiment of a third aspect of the invention.
Figure 9:
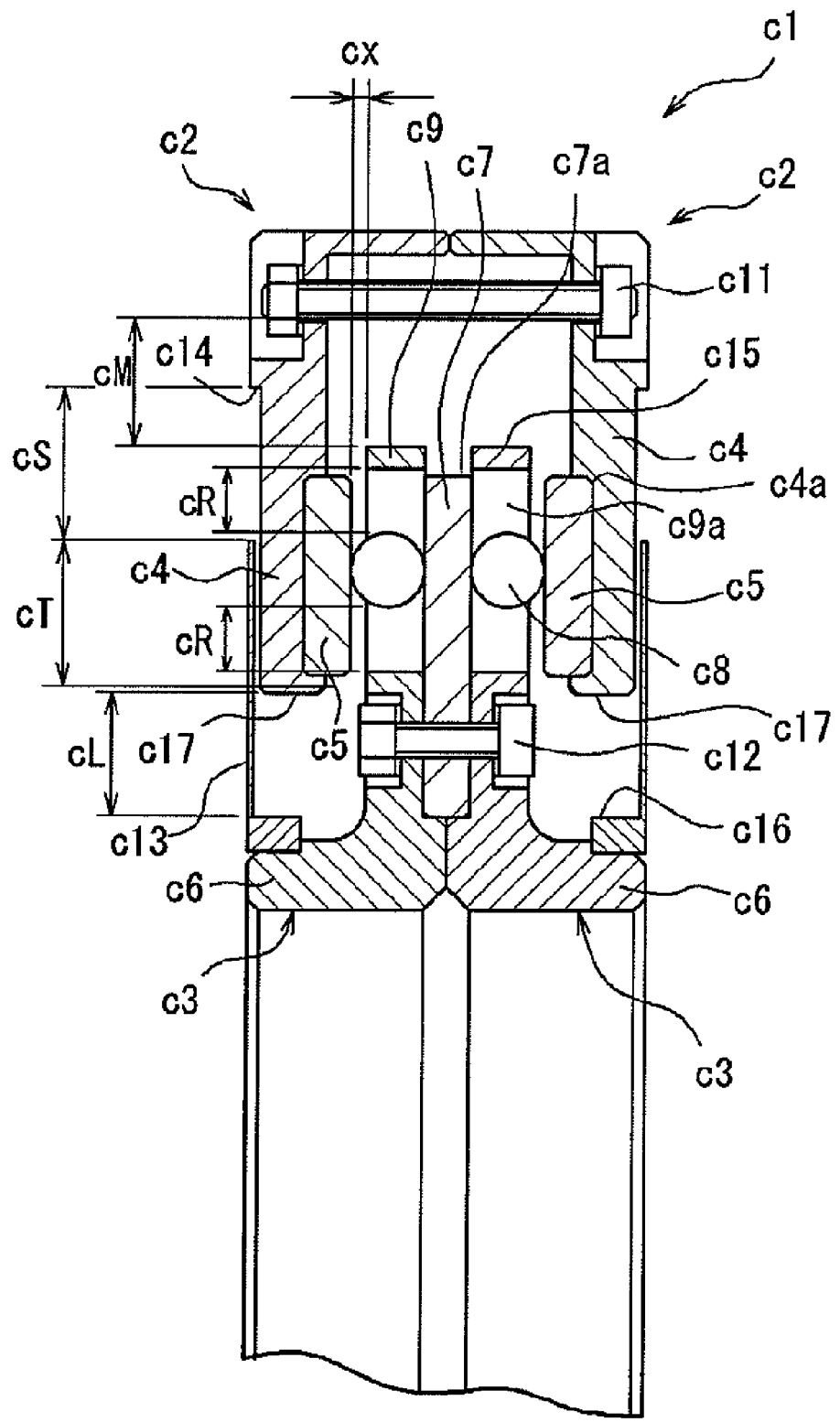
FIG. 9 is a sectional view showing the eccentric thrust bearing assembly according to the first embodiment of the third aspect of the invention.

FIG. 8 is an exploded perspective view showing an eccentric thrust bearing assembly according to a first embodiment of the third aspect of the invention. FIG. 9 is a sectional view of the bearing assembly (the lower half from its axis is omitted). As shown in FIG. 8 and FIG. 9, this bearing assembly c1 includes: two annular axially outside members c2, c2 axially opposing each other and integrally interconnected at places adjacent the radially outside circumferences thereof by means of outside screws c11 (shown in FIG. 9 but omitted in FIG. 8); and an annular axially inside member c3 interposed between these two axially outside members. FIG. 9 shows a neutral state (hereinafter, also referred to as "standard state") wherein balls c8 as the rolling elements are not moved in any of the radial directions.

Each of these two axially outside members c2, c2 includes: an annular axially outside case c4; and an outer race c5 formed of an annular plate mounted to an inner side of the axially outside case c4. The axially outside case c4 and the outer race c5 are separate members. The outer race c5 formed of the annular plate is fixed to a recess c4a formed on an opposing side of the axially outside case c4 to the outer race (FIG. 9). Furthermore, the two axially outside cases c4, c4 are integrally interconnected at places adjacent the radially outside circumferences thereof by means of the outside screws c11 (shown in FIG. 9 but omitted in FIG. 8). The axially inside member c3 includes: two annular axially inside cases c6, c6; and an inner race c7 formed of an annular plate clamped between these two axially inside cases c6, c6 on the both sides thereof and fixed thereto by means of inside screws c12 (shown in FIG. 9 but omitted in FIG. 8). The axially inside cases c6, c6 and the inner race c7 are separate members. These three members are integrally interconnected by means of the inside screws c12 (shown in FIG. 9 but omitted in FIG. 8) in a state where the inner race c7 is clamped between the two axially inside cases c6, c6. As shown in FIG. 9, an axial center of the inner race c7 is aligned with an axial center of the bearing assembly c1, so that the bearing assembly c1 has a symmetric structure with respect to a plane perpendicular to the axis and passing through the center thereof.

In the bearing assembly c1 according to the first embodiment, the axially inside case c6 is unified with a rolling-element guide c9. Specifically, the flange-like rolling-element guide c9 is extended radially outwardly from an outside circumference of the annular axially inside case c6. The annular rolling-element guide c9 is formed with movable-range delimiting holes c9a circumferentially arranged with equal spacing, the movable-range delimiting hole defined by a circular through-hole for delimiting the movable range of each ball c8 as the rolling element. All the movable-range delimiting holes c9a have the same diameter and radial position (in the standard state). Each of the balls c8 is disposed in each of the movable-range delimiting holes c9a in one-to-one correspondence, and is positioned centrally of the movable-range delimiting hole c9a in the standard state (FIG. 9). An axial gap cX is defined between an axially outer side of the rolling-element guide c9 and a raceway surface of the outer race c5, such that the rolling-element guide c9 and the outer race c5 do not come into contact with each other or are not slid on each other even when the bearing assembly c1 is subjected to the relative movement.

The bearing assembly constitutes a double-row thrust bearing assembly wherein both of the axially opposite sides of the inner race c7 define raceway surfaces, whereas a plurality of balls c8 as the rolling elements are clamped between each of the opposite sides of the inner race and each of the outer races c5, c5 in opposing relation therewith. Each of the rows includes 32 balls c8 so that 64 balls c8 in total are used in the bearing assembly. In each row, these balls c8 are circumferentially arranged with substantially equal spacing. In this manner, the plural balls c8 serving as the support points of the bearing assembly c1 are circumferentially arranged with substantially equal spacing, whereby the bearing assembly is able to bear the axial loads and the moment load in a stable manner while the loads on the individual balls c8 may be equalized.

The bearing assembly c1 is provided with shields c13, c13 of thin annular plates on the axially outermost sides thereof. As shown in FIG. 9, these shields c13, c13 are fixed to axially outside ends of the axially inside case c6 and are extended radially outwardly therefrom along axially outer sides of the axially outside cases c4. The shields c13, c13 are each disposed in a manner to overlap the axially outer side of each of the axially outside cases c4 via a minor gap therebetween. Hence, the shields have a sealing function to prevent the invasion of foreign substances into the bearing assembly c1 and the leakage of the lubricant such as a lubricating oil or grease from the bearing assembly c1. A seal for sealing the interior of the bearing assembly c1 may also be added for further enhancing the sealing effect.

The all of the members of the bearing assembly c1 except for the balls c8 as the rolling elements are shaped like rings having constant radial widths with respect to the overall circumference, and are coaxially arranged in the standard state. In the standard state, therefore, a gap of a radial distance cM is defined between an outer periphery c15 of the rolling-element guide, or the radially outermost end of the axially inside member c3, and the axially outside member c2, c2, and is extended along the overall circumferential length. Likewise, in the standard state, a gap of a radial distance cL is defined between the radially innermost end c17 of the axially outside member c2, c2 and the axially inside member c3 (an opposing surface c16 of the shield c13 fixed to the axially inside case c6, the surface opposing the radially innermost end c17 of the axially outside member c2, c2 according to the embodiment), and is extended along the overall circumferential length. Thus, the bearing assembly c1 includes the constant gaps extended along the overall circumferential length and hence, permits a relative movement of a constant distance with respect to every circumferential direction. A relatively movable range between the axially outside members c2 and the axially inside member c3 is decided by the radial gaps therebetween.

On the other hand, the outer races c5, c5 are annular plate members having a predetermined radial width which is constant with respect to the overall circumference. Thus, the outer races c5, c5 have the radial width, whereas the inner race c7, having a greater radial width than that of the outer races, opposes the outer races c5, c5. Each of the movable-range delimiting holes c9a of the rolling-element guide c9 has a greater diameter than the diameter of the ball c8 accommodated in each of the movable-range delimiting holes c9a and hence, a gap allowing for the movement of the ball c8 is defined around the ball c8. On the other hand, the outer and inner races c5, c7 oppose each other via the respective overall areas of the movable-range delimiting holes c9a such that the balls c8 moved across the whole areas of the movable-range delimiting holes c9a may not be disengaged from the outer and inner races c5, c7. Thus, each of the balls c8 is allowed to move radially and circumferentially within the range limited by the movable-range delimiting hole c9a. That is, this bearing assembly c1 permits the ball c8 to be rolled so far at to abut against an inner periphery of the movable-range delimiting hole c9a. Since the ball c8 is positioned centrally of the movable-range delimiting hole c9a in the standard state, a gap of a width cR is defined between the ball c8 and the inner periphery of the movable-range delimiting hole c9a as extended along the overall circumference about the ball c8 (FIG. 9). Hence, the ball c8 is allowed to move for the distance cR in any direction of a working plane.

In this bearing assembly c1, the aforesaid distance cL is defined to be twice the aforesaid distance cR. That is, the following equation holds:

$$cL = 2(cR).$$

The equation corresponds to that the moving distance of the ball c8 as the rolling element is a half (½) of the distance of the relative movement between the outer and inner races c5, c7. On the other hand, the aforesaid distance cM is substantially equal to the distance cL. It is more preferred to define the distance cM to be equal to the distance cL. Furthermore, the above distance may have a relation $cL \geq 2(cR)$.

In the bearing assembly c1 as described above, the relatively movable range provided by the radial gap between the axially outside members c2 and the axially inside member c3 corresponds to the movable range of the ball c8 that is limited by the diameter of the movable-range delimiting hole c9a. That is, when the axially outside members c2 and the axially inside member c3 are relatively moved so far as to reduce the aforesaid distance cL (between the radially innermost ends c17 of the axially outside members c2, c2 and the axially inside member c3) to zero, the balls c8 are moved in the movement direction so far as to reduce the space distance cR thereabout to zero. In other words, when the axially outside members c2 and the axially inside member c3 are relatively moved to each other across the whole relatively movable range therebetween, the balls c8 are moved across the whole movable ranges thereof. Therefore, no excessive space exists between the radially innermost ends c17 of the axially outside members c2 and the axially inside member c3. Hence, the bearing assembly c1 may be downsized while the decenterable range thereof may be increased. It is also possible to reduce the weight and cost of the bearing assembly c1.

According to the bearing assembly c1 of the first embodiment, the aforesaid distance cL is substantially equal to the distance cM (the radial space distance between the outer periphery c15 of the rolling-element guide and the axially outside member c2, c2). That is, the distance cM is substantially twice the distance cR. According to such a design, the space distance M is minimized, so that the outside diameter of the axially outside member c2 may be decreased, permitting the downsizing of the bearing assembly c1. In a case where there is a great difference between the distance cL and the distance cM, the smaller one of these space distances limits the decenterable range of the bearing assembly c1. However, the embodiment substantially equalizes these space distances, thereby accomplishing the size reduction of the bearing assembly c1 and also maximizing the decenterable range of the bearing assembly c1.

Further according to the bearing assembly c1, the radially moving distance of the ball c8 as the rolling element confined by the rolling-element guide c9 substantially corresponds to the radial width of the outer race c5. As shown in FIG. 9, the radial width of the outer race c5 is substantially equal to the diameter of the movable-range delimiting hole c9a (or more precisely, slightly smaller than the diameter of the movable-range delimiting hole c9a). This prevents the ball c8 from disengaging from the outer race c5 when the ball is radially moved so far as to contact the inner periphery of the movable-range delimiting hole c9a. On the other hand, the radial width of the outer race c5 is not increased more than necessary.

Furthermore, the radial widths of the inner race c7 is greater than the diameter of the movable-range delimiting hole c9a in order to provide a clamping allowance for fixing the inner race c7. The radial width of the inner race is not increased more than necessary. The inner race c7 is clamped between the two axially inside cases c6, c6 so as to be fixed to place. Therefore, the radial width of the inner race is greater than the diameter of the movable-range delimiting hole c9a in order to provide the clamping allowance. However, the radial position of an outer periphery of the inner race c7 is aligned with that of an outer periphery of the outer race c5.

Thus, the radial width of the outer race c5 substantially corresponds to the radially moving distance of the ball c8 as the rolling element, whereas the radial width (minus the above clamping allowance) of the inner race c7 also substantially corresponds to the radially moving distance of the ball c8. Hence, the radial widths of the outer and inner races c5, c7 are minimized. The outer and inner races c5, c7 are formed from the iron-base metal such as a bearing steel, whereas the axially outside case c4 and the axially inside case c6 may be formed from the light metal such as an aluminum alloy. Therefore, the bearing assembly c1 may be reduced in the weight and cost thereof by reducing the size of the outer and inner races c5, c7.

When the bearing assembly c1 is moved in the circular range limited by the movable-range delimiting hole c9a of the rolling-element guide c9, the outer and inner races c5, c7 do not slide on the rolling-element guides c9. This is because the rolling-element guide c9 is fixed to the axially inside member c3 so as to be unified with the inner race c7, and because the aforesaid gap cX (FIG. 2) keeps the rolling-element guide c9 and the outer race c5 out of contact. Accordingly, the bearing assembly 1 is notably reduced in resistance during the relative movement.

The rolling-element guide c9 has an annular shape and is formed with the 32 movable-range delimiting holes c9a arranged on the same circle with equal circumferential spacing. Since each of the balls c8 as the rolling elements is disposed in each of the movable-range delimiting holes c9a, the bearing assembly c1 has the support points uniformly distributed in the radial and circumferential directions thereof, so as to be able to bear the axial loads and the moment load in a more stable manner. Since each of the rolling elements is disposed in each of the movable-range delimiting holes c9a, the individual balls c8 are assuredly kept out of sliding contact with one another so that the bearing assembly is further reduced in resistance during the relative movement. The movable-range delimiting holes c9a may be increased in number unless adjoining movable-range delimiting holes c9a are in contact with each other. Thus, the bearing assembly c1 may be increased in load capacity by increasing the balls c8.

According to the embodiment as shown in FIG. 9, the two axially inside cases c6, c6 on the opposite sides of the inner race c7 have the same phase with respect to either side of the inner race c7. In the standard state, therefore, the positions of the movable-range delimiting holes c9a and the balls c8 also have the same phase with respect to either side of the inner race c7. However, the third aspect of the invention is not limited to such a constitution. The movable-range delimiting holes c9a and the balls c8 on one side of the inner race may have a different phase from that of the movable-range delimiting holes and balls on the other side thereof.

The shields c13, c13 are so designed as not to limit the decenterable range of the bearing assembly c1. As shown in FIG. 9, a radial distance cS is slightly greater than the distance cL in the standard state, the distance cS defined between the radial outermost end of the shield c13, c13 and a shield-dedicated step c14 formed on an outer side of the axially outside case c4 and having a depth substantially equal to a plate thickness of the shield c13, c13. A radial length cT of an overlap portion of the shield c13, c13 on the outer side of the axially outside case c4, as determined in the standard state, is slightly greater than the distance cL such that the shield may cover the interior of the bearing assembly c1 in the relative movement across the whole decenterable range of the bearing assembly.

The following method may be taken to position the individual balls c8 at the positions shown in FIG. 9, or to position the individual balls centrally of the respective movable-range delimiting holes c9a. That is, in a state where a small pre-load is applied between the inside and outside members by means of the pre-load applying screws or the like, the bearing assembly c1 may be subjected to the maximum relative movement with respect to every radial direction (along the overall circumference). By doing so, any ball c8 displaced from the center of the movable-range delimiting hole c9a in the standard state may be slidably moved on the outer and inner races c5, c7 as pushed by the inner periphery of the movable-range delimiting hole c9a, so as to be adjusted into position. When the bearing assembly c1 is used subsequently, the pre-load applying screws may be fastened with a predetermined torque. It is preferred that the inner periphery of the movable-range delimiting hole c9a of the rolling-element guide c9 has a height (axial thickness) of not less than a radius (ball size/2) of the ball c8, because the apex of the ball c8 abuts against the inner periphery of the movable-range delimiting hole c9a when pushed by the inner periphery, so that the positional adjustment of the ball c8 may be carried out in a stable manner.

As described above, the rolling-element guide c9 does not merely limit the movable range of the ball c8 but also plays the roles of permitting the ball c8 to be assuredly and easily positioned at the center of the movable-range delimiting hole c9a (the standard state) and of providing the constant distance cR about the center position thereby allowing the ball c8 to move within this range. The bearing assembly c1 according to the first embodiment may encounter a problem that some of the balls c8 are lifted up from the outer or inner race c5, c7 due to the unbalanced load applied to the balls and the lifted balls c8 are displaced from the center of the movable-range delimiting holes c9a in the standard state. In this case, as well, the bearing assembly c1 in the assembled state may be subjected to the maximum relative movement under the small pre-load, thereby accomplishing the positional adjustment of the balls c8 quite easily. In order to prevent the displacement of the balls c8 for maintaining the PCD (Pitch Circle Diameter) of the individual balls c8, the pre-load may preferably be applied between the inside and outside members by means of the pre-load applying screws or the like, thereby suppressing the sliding movement between the individual balls c8 and the outer and inner races c5, c7.

A material for the bearing assembly c1 is not particularly limited. From the standpoint of reducing the weight of the bearing assembly c1, however, the axially outside cases c4 and the axially inside cases c6 may preferably be formed from the light metal such as an aluminum alloy or from a resin, whereas the inner races c7 and the outer races c5 may preferably be formed from the iron-base metal such as bearing steel. In such a constitution, only the outer and inner races c5, c7 of the axially outside member c2 and the axially inside member c3 are formed from a bearing steel or the like having high hardness, the outer and inner races contacting the balls c8. On the other hand, the axially outside case c4 and the axially inside case c6 are formed from the light metal such as an aluminum alloy so as to reduce the weight of the bearing assembly c1. In common practice, the ring-like cage c9 is formed from a resin or the like, whereas the balls c8 are formed from a bearing steel or the like. The shield c13 may be formed from a stainless steel or a resin.

Figure 10:
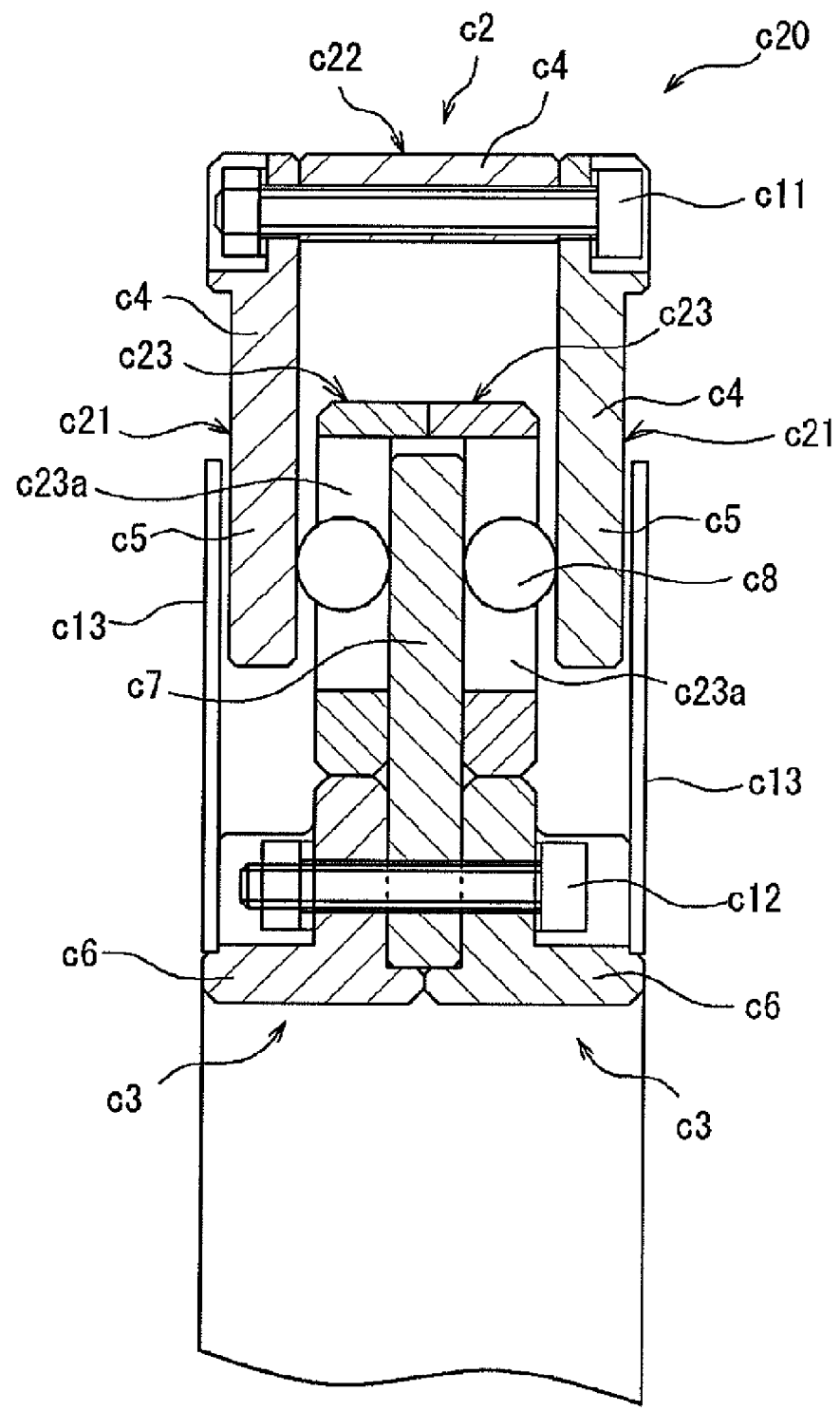
FIG. 10 is a sectional view showing a bearing assembly according to a second embodiment of the third aspect of the invention.

FIG. 10 is a sectional view showing a bearing assembly c20 (the lower half from its axis is omitted) according to a second embodiment of the third aspect of the invention. Unlike the bearing assembly c1 of the first embodiment, the axially outside member c2 of the bearing assembly c20 includes: outside integral members c21, c21 each unifying the outer race c5 with a part of the axially outside case c4; and a ring-like outside case c22 constituted by the remaining parts of the individual axially outside cases c4. The two outside integral members c21, c21 formed of substantially annular plates are integrally interconnected at places adjacent the radially outside circumferences thereof by means of outside screws c11. The outside integral members are interconnected via the ring-like outside case c22 interposed therebetween. Such a design is preferred in that the number of components is decreased and that it is easy to decrease the axial thickness of the bearing assembly c20. However, in a case where the outer race is formed from a bearing steel, the whole body of the outside integral member unifying the outer race with a part of the axially outside case is formed from the bearing steel. This is disadvantageous from the viewpoint of the weight reduction. From the standpoint of weight reduction, it is more preferable to employ the separate axially outside case c4 and outer race c5 as illustrated by the bearing assembly c1 of the first embodiment.

In this bearing assembly c20, a rolling-element guide c23 is not unified with the axially inside case but is formed as an independent member, unlike the rolling-element guide of the bearing assembly c1 of the first embodiment. The rolling-element guide c23 is formed from a resin. The two rolling-element guides c23, c23 are disposed on the opposite sides of the inner race c7. Likewise to the rolling-element guide c9 of the first embodiment, the rolling-element guide c23 has an annular shape and is formed with a plurality of movable-range delimiting holes c23a arranged on the same circle with equal circumferential spacing. All these movable-range delimiting holes c23a have the same diameter. The rolling-element guides c23, c23 are fixed to the axially inside member c3, such as the inner race c7 or the axially inside cases c6, by way of fixing means such as screws. Hence, the separate rolling-element guide c23 limits the movable range of the ball c8 to a circular area of a predetermined radius, similarly to the rolling-element guide c9 of the first embodiment. In such a case where the rolling-element guide c23 is formed as the separate member, the rolling-element guide may be formed from a different material such as a resin. This is advantageous in terms of cost reduction and weight reduction.

Figure 11:
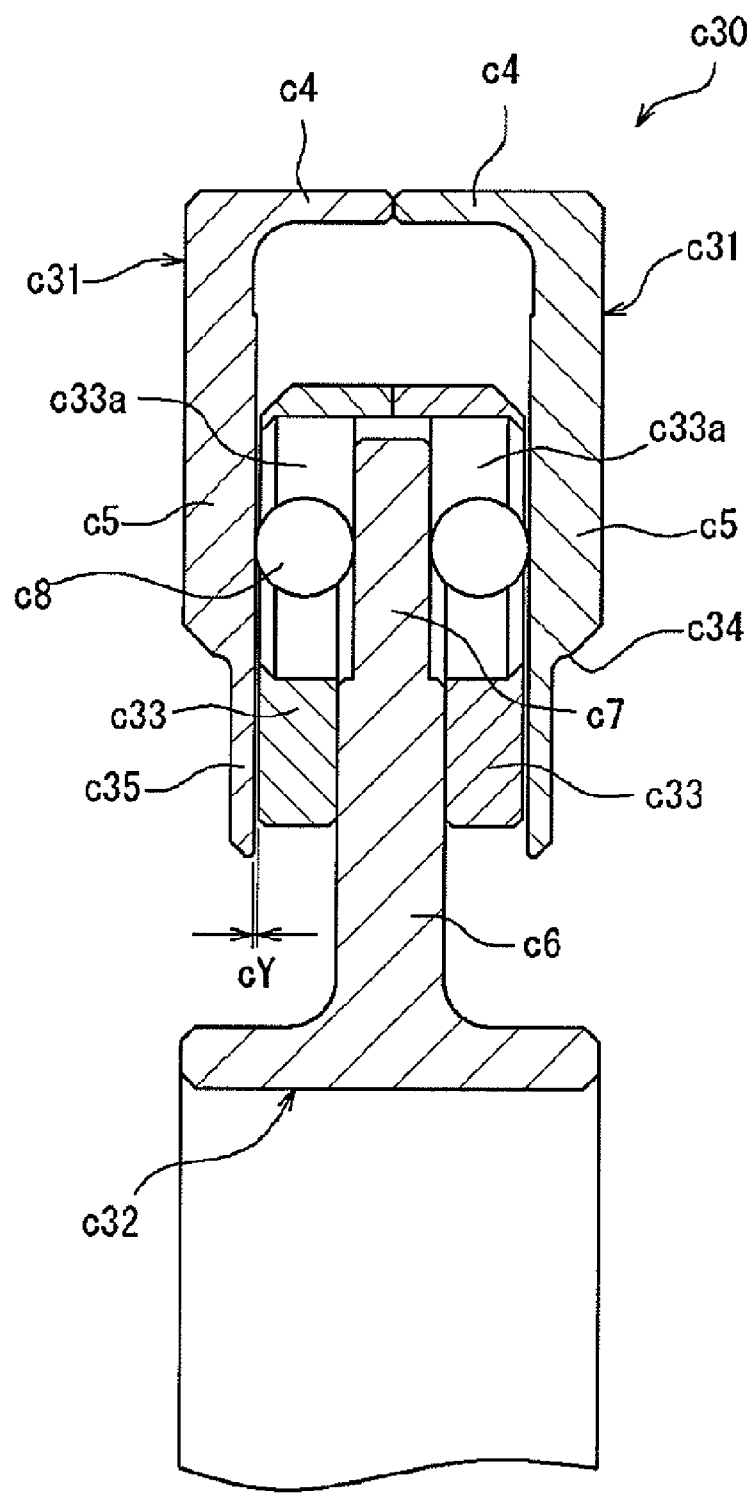
FIG. 11 is a sectional view showing a bearing assembly according to a third embodiment of the third aspect of the invention.

FIG. 11 is a sectional view showing a bearing assembly c30 (the lower half from its axis is omitted) according to a third embodiment of the third aspect of the invention. The bearing assembly c30 is resemblant to the bearing assembly c20 of the second embodiment in that the outer race c5 and the axially outside case c4 of the axially outside member c2 are unified. However, the bearing assembly c30 differs from the bearing assembly c20 in that the bearing assembly c30 includes outside integral members c31, c31 wherein a portion equivalent to the ring-like outside case c22 of the second embodiment is also unified. Furthermore, this bearing assembly c30 employs an inside integral member c32 unifying the inner race c7 with the axially inside cases c6, c6. Therefore, this bearing assembly is further reduced in the number of components as compared with the bearing assembly c20 of the second embodiment. Thus, this bearing assembly is more preferred in that the axial thickness of the bearing assembly can be reduced. However, this bearing assembly has the aforementioned disadvantage in terms of the weight reduction. From the standpoint of weight reduction, it may be more preferable to employ the separate inner race c7 and axially inside cases c6 and the separate axially outside cases c4 and outer races c5 as illustrated by the bearing assembly c1 of the first embodiment.

In this bearing assembly c30, a resin-formed rolling-element guide c33 is designed to exhibit a shielding effect as well. Specifically, an axially outer side of the rolling-element guide c33 extends in close proximity to a raceway surface of the outside integral member c31 so as to define a minor axial gap cY (FIG. 11) therebetween. The outside integral member c31 has a structure including: a step c34 formed at place radially inwardly relative to the raceway surface on which the balls c8 are rolled; and an annular thin portion c35 extended radially inwardly from the step c34. The shielding effect results from the minor axial gap cY defined between the annular thin portion c35 and the rolling-element guide c33. Such a constitution negates the need for providing the separate shield c13 such as employed by the bearing assembly c1 of the first embodiment and hence, the number of components is further reduced. Furthermore, the bearing assembly c30 may be further reduced in weight by forming the annular thin portion c35 in a smaller thickness, the annular thin portion constituting a portion of the outside integral member c31 that functions as the shield.

Likewise to the bearing assembly c20, this bearing assembly c30 is also provided with two rolling-element guides c33, c33, which are resin-formed members separate from the inside integral member c32 and such. The rolling-element guides c33, c33 are fixed to the inside integral member c32 by way of suitable means such as screws. Similarly to the rolling-element guides c9 of the first embodiment, the rolling-element guide c33, c33 have an annular shape and are each formed with a plurality of movable-range delimiting holes c33a arranged on the same circle with equal circumferential spacing. All these movable-range delimiting holes c33a have the same diameter. The separate rolling-element guides C33, c33 each serve to limit the movable range of the ball c8 to a circular area of a predetermined radius, similarly to the rolling-element guide c9 of the first embodiment. The bearing assembly c30 may also be provided with an additional preload applying screw or the like, for example, in order to prevent the two outside integral members c31, c31 from separating from each other.

In a case where the bearing assembly according to the third aspect of the invention is used as an assemble member mounted to an external member other than the bearing assembly, which is provided with means using, for example, a reaction force of rubber, spring or the like for restricting the movement range, if a range restricted by the above means is smaller than the decenterable range of the bearing assembly, the bearing assembly does not encounter interference with the components of the external member.

The above embodiments illustrate the examples where the axially outside member c2 is disposed on the radially outer side, whereas the axially inside member c3 is disposed on the radially inner side of the axially outside member c2. Conversely, the axially outside member c2 may be disposed on the radially inner side, whereas the axially inside member c3 may be disposed on the radially outer side of the axially outside member c2. In this case, the annular inner race c7 of the axially inside member c3 is projected radially inwardly from the axially inside case c6. While the foregoing embodiments illustrate the examples where the rolling-element guide c9 is fixed to the axially inside member c3, the rolling-element guide may be fixed to the axially outside member c2.

As described above, the third aspect of the invention may provide the double-row eccentric thrust bearing assembly which allows for the relative movement of a constant distance and which is extremely decreased in energy loss during the relative movement.

A fourth aspect of the invention will hereinbelow be described with reference to the drawings.

Figure 12:
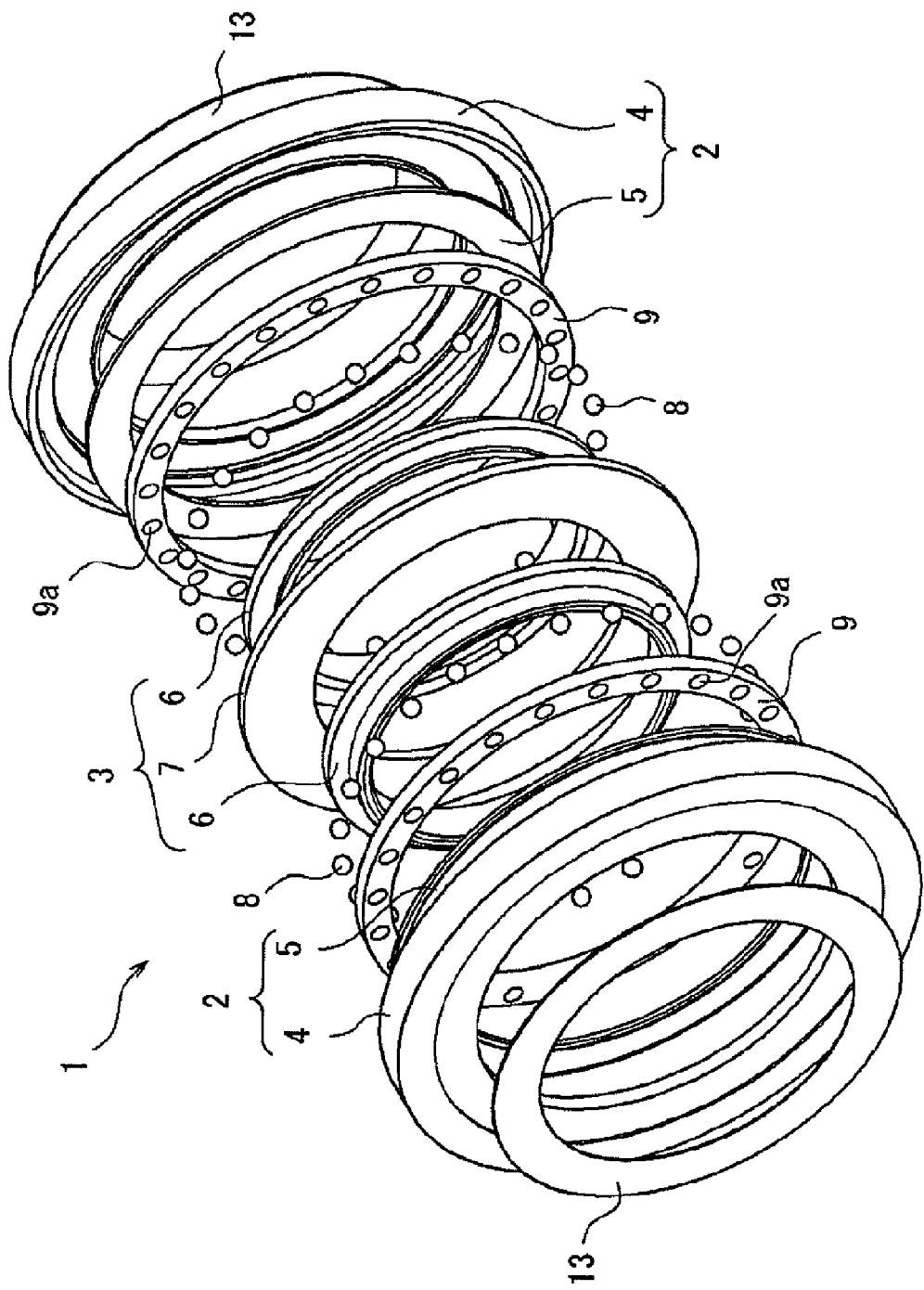
FIG. 12 is an exploded perspective view showing an eccentric thrust bearing assembly according to a first embodiment of a fourth aspect of the invention.
Figure 13:
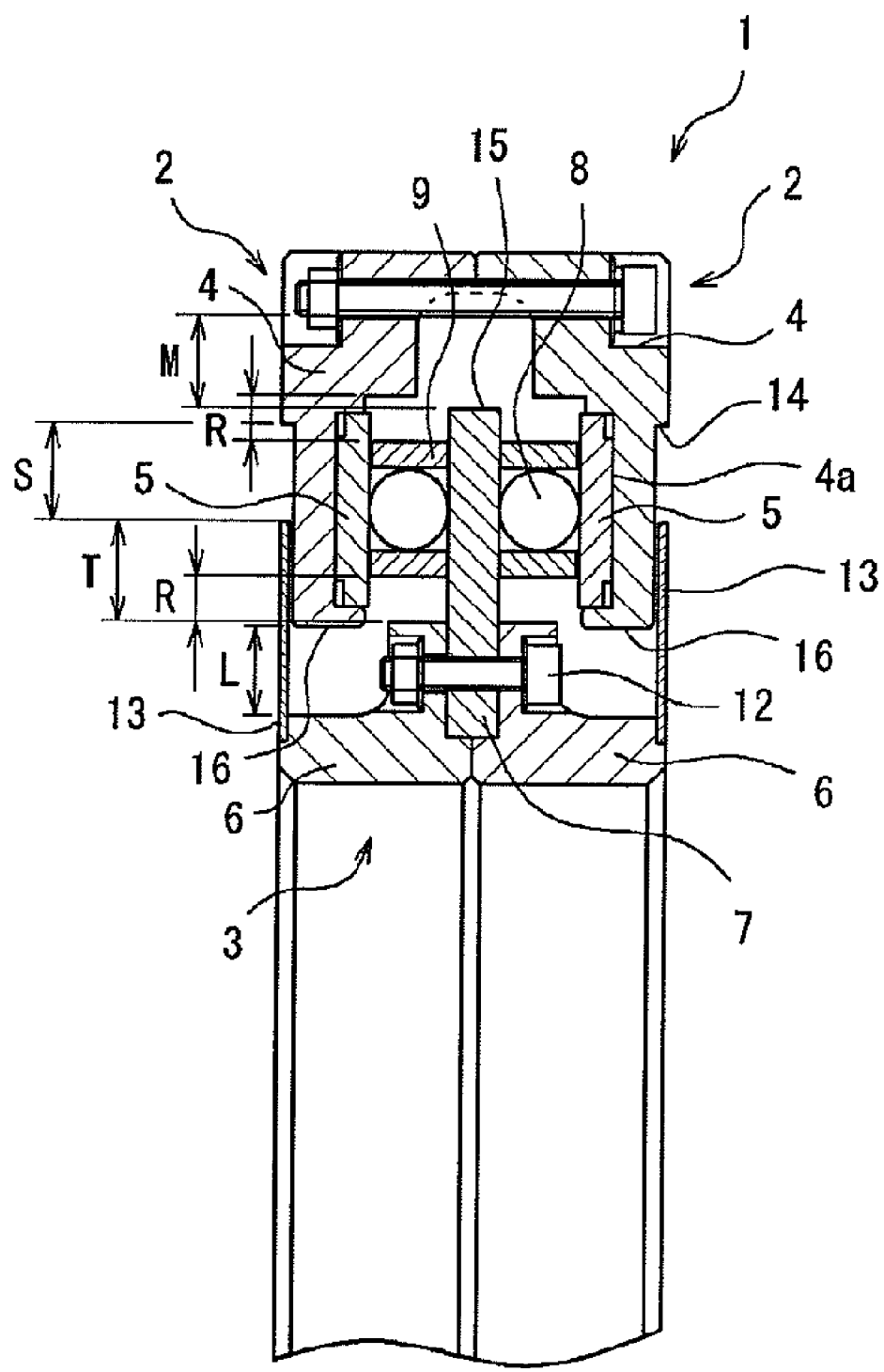
FIG. 13 is a sectional view showing the eccentric thrust bearing assembly according to the first embodiment of the fourth aspect of the invention

FIG. 12 is an exploded perspective view showing an eccentric thrust bearing assembly according to a first embodiment of the fourth aspect of the invention. FIG. 13 is a sectional view of the bearing assembly (the lower half from its axis is omitted). As shown in FIG. 12 and FIG. 13, this bearing assembly 1 includes: two annular axially outside members 2, 2 opposing each other and integrally interconnected; and an annular axially inside member 3 interposed between these two axially outside members. FIG. 13 shows a neutral state (hereinafter, also referred to as "standard state") wherein balls 8 as the rolling elements are not moved in any of the radial directions.

The two axially outside members 2, 2 each include: an annular axially outside case 4; and an annular outer race 5 formed of an annular plate mounted to an opposing side of the axially outside case 4. The axially outside case 4 and the outer race 5 are separate members. The outer race is mounted in a recess 4a formed in the opposing side of the axially outside case 4 (FIG. 13). The two axially outside cases 4, 4 are integrally interconnected at places adjacent the radially outside circumferences thereof by means of outside screws 11 (shown in FIG. 13 but omitted in FIG. 12). The axially inside member 3 includes: two annular axially inside cases 6, 6; and an inner race 7 formed of an annular plate extended in a flange-like fashion as projected radially outwardly relative to the two axially inside cases 6, 6. The axially inside cases 6, 6 and the inner race 7 are separate members. In a state where the inner race 7 is clamped between the two axially inside cases 6, 6, these three members are integrally interconnected by means of inside screws 12 (shown in FIG. 13 but omitted in FIG. 12). As shown in FIG. 13, an axial center of the inner race 7 is aligned with an axial center of the bearing assembly 1, so that the bearing assembly 1 has a symmetric structure with respect to a plane perpendicular to the axis and passing through the center thereof.

Both of the opposite sides of the inner race 7 constitute raceway surfaces. The plural balls 8 as the rolling elements are clamped between each of the opposite sides of the inner race 7 and each of the two outer races 5, 5 in opposing relation with the inner race. Thus, the bearing assembly 1 has a double-row structure. Each of the rows includes 24 balls 8 so that 48 balls 8 in total are used in the bearing assembly. In each row, these balls 8 are circumferentially arranged with substantially equal spacing. Each of the ball rows is provided with a ring-like cage so that a total number of two cages 9, 9 are used in the bearing assembly. The ring-like cage 9 is formed with pocket holes 9a substantially at regular space intervals, while each of the balls 8 is rollably accommodated in each of the pocket holes. The ring-like cage 9 maintains the individual balls 8 in mutually substantially equally spaced relation with respect to the circumferential direction. In this manner, the plural balls 8 serving as the support points of the bearing assembly 1 are circumferentially arranged substantially with equal spacing, so that the bearing assembly is able to bear the axial loads and the moment load in a stable manner. While at least three balls 8 are necessary for each row, the number of balls 8 may be properly decided based on the load capacity and the size of the bearing assembly.

Both of the outer and inner races 5, 7 are annular members, thus defining circumferentially continuous raceway surfaces. Accordingly, the balls 8 are able to orbit. That is, this bearing assembly 1 permits the axially outside member 2 and the axially inside member 3 to freely rotate relative to each other. Incidentally, the ring-like cage 9 is moved in conjunction with the balls 8.

The bearing assembly 1 is provided with shields 13, 13 on axially outermost sides thereof, the shield formed of an annular thin plate. As shown in FIG. 13, the shields 13, 13 are each fixed to an axially outside end of the axially inside case 6 and extended therefrom along an axially outer side of the axially outside case 4 toward a radially outer side. Each of the shields 13, 13 is so disposed as to overlap the axially outer side of the axially outside case 4 via a minor gap therebetween, thus exhibiting a sealing function to prevent the invasion of foreign substances into the bearing assembly 1 as well as the leakage of the lubricant (lubricating oil, grease or the like) in the bearing assembly 1. Furthermore, a seal for sealing the interior of the bearing assembly 1 may be added for further enhancing the sealing effect, thereby preventing the invasion of water or the like into the bearing assembly 1.

The all of the members of the bearing assembly 1 except for the balls 8 as the rolling elements are shaped like rings having constant radial widths with respect to the overall circumference, and are coaxially arranged in the standard state. In the standard state, therefore, a gap of a radial distance M is defined between the radially outermost end 15 of the axially inside member 3 and the axially outside members 2, 2 and extended along the overall circumferential length. Likewise, in the standard state, a gap of a radial distance L is defined between each of the radially innermost ends 16 of the axially outside members 2, 2 and the axially inside member 3 and extended along the overall circumferential length. Thus, the bearing assembly 1 includes the constant gaps extended along the overall circumferential length and hence, is adapted to be decentered by a constant distance with respect to every circumferential direction. A relatively movable range between the axially outside members 2 and the axially inside member 3 is decided by the radial gaps therebetween.

On the other hand, the outer races 5, 5 are annular plate members having a predetermined radial width which is constant with respect to the overall circumference. Thus, the outer races 5, 5 have the radial width, whereas the axially inside case 7, having a greater radial width than that of the outer races 5, 5, opposes the respective outer races 5, 5. Therefore, the balls 8 have space to move radially. In this bearing assembly 1, the balls 8 are accommodated in the ring-like cage 9. Hence, the balls 8 are allowed to move radially until an inner periphery or an outer periphery of the ring-like cage 9 abuts against the axially inside member 3 or the axially outside member 2. In the bearing assembly 1 in the standard state, a gap of a radial distance R is defined between the outer periphery of the ring-like cage 9 and the axially outside member 2 and extended along the overall circumferential length, whereas a gap of the same radial distance R is defined between the inner periphery of the ring-like cage 9 and the axially inside member 3 and extended along the overall circumferential length (FIG. 13). The radial space R permits the balls 8 and the ring-like cage 9 to move for the distance R in every radial direction.

In this bearing assembly 1, the aforesaid distance L is defined to be twice the aforesaid distance R. That is, the following equation holds:

L=2R.

The equation corresponds to that the moving distance of the ball c8 as the rolling element is a half (½) of the distance of the relative movement between the outer and inner races 5, 7. It is preferred that the aforesaid distance M is substantially equal to the distance L. It is more preferred that the distance M is equal to the distance L. Furthermore, the above distance may have a relation L≧2R.

In the bearing assembly 1 as described above, the relatively movable range provided by the radial gap between the axially outside members 2 and the axially inside member 3 substantially corresponds to the radially movable distance of the balls 8 as the rolling elements. Accordingly, when the axially outside members c2 and the axially inside member c3 are decentered so far as to reduce the aforesaid radial distance L (the radial space distance between the radially innermost ends 16 of the axially outside members 2, 2 and the axially inside member 3) to zero, the balls 8 as the rolling elements are moved to reduce the space distance R to zero with respect to the decentered direction. Therefore, there is no excessive space between the radially innermost ends 16 of the axially outside members 2, 2 and the axially inside member 3, whereas the outer and inner races 5, 7 for the radial movement of the balls 8 define no excessive space therebetween. As a result, the bearing assembly 1 may be downsized while the decenterable range thereof may be increased.

That the outer and inner races 5, 7 for the radial movement of the balls 8 define no excessive space therebetween also means that the radial widths of the outer race 5 and the inner race 7 as the determinant factors of the space distance R are minimized. Thus, the outer and inner races 5, 7 are downsized, resulting in the reduction of the size and weight of the bearing assembly 1 and the cost reduction. It is noted that the inner race 7 has a greater radial width than that of the outer race 5. This is because the inner race has a clamping allowance on which the inner race is clamped between the axially inside cases 6, 6 when the inner race 7 is connected with the axially inside cases 6, 6. The radial width of the inner race 7 is not unduly increased.

According to the bearing assembly 1 of the first embodiment, the distance L is defined to be substantially equal to the distance M (the radial space distance between the radially outermost end 15 of the axially inside member 3 and the axially outside members 2, 2). In short, the distance M is substantially twice the distance R (the movable distance of the ball 8 as the rolling element). Therefore, the radial space between the radially outermost end 15 of the axially inside member 3 and the axially outside members 2, 2 is also minimized. Thus, the outside diameter of the axially outside member 2 may be reduced so that the bearing assembly 1 may be downsized.

The distance L is substantially equal to the distance M. Therefore, when the axially inside member 3 and the axially outside members 2 are relatively moved or decentered so far as to reduce the distance L to zero with respect to a radial direction, the distance M with respect to the radial direction is also reduced to zero. In a case where there is a great difference between the space distance L and the space distance M, the smaller one of these space distances limits the decenterable range of the bearing assembly 1. However, the embodiment substantially equalizes these distances, thereby accomplishing the size reduction of the bearing assembly 1 and also maximizing the decenterable range of the bearing assembly 1.

The shields 13, 13 are so designed as not to limit the decenterable range of the bearing assembly 1. As shown in FIG. 13, a radial distance S is slightly greater than the distance L in the standard state, the distance S defined between the radial outermost end of the shield 13, 13 and a shield-dedicated step 14 formed on the outer side of the axially outside case 4 and having a depth substantially equal to a plate thickness of the shield 13, 13. A radial length T of an overlap portion of the shield 13, 13 on the outer side of the axially outside case 4, as determined in the standard state, is defined to be slightly greater than the distance L such that the shield may cover the interior of the bearing assembly 1 in the relative movement across the whole decenterable range of the bearing assembly.

The following method may be taken to position the individual balls 8 and the ring-like cage 9 at the positions shown in FIG. 13, or to position the individual balls and the ring-like cage radially centrally of the outer race 5 in the standard state. That is, in a state where a small pre-load is applied between the inside and outside members by means of the pre-load applying screws or the like, the bearing assembly 1 may be moved across the whole relatively movable range or moved to the limit of the decenterable range along the overall circumference thereof. By doing so, the outer periphery or inner periphery of the ring-like cage 9 may be properly abutted against the axially outside member 2 or the axially inside member 3 so as to cause the balls 8 and the ring-like cage 9 to properly slide on the outer and inner races 5, 7, whereby the balls and the ring-like cage are adjusted into position. Subsequently, the pre-load applying screws may be fastened with a predetermined torque. Thus, the ring-like cage 9 makes it quite easy to position the balls 8 radially centrally of the outer race 5.

In a case where the balls 8 as the rolling elements are subjected to the unbalanced load, a fear exists that some of the balls 8 may be displaced as lifted up. However, the provision of the ring-like cage 9 obviates the problem that some of the balls 8 are moved to disturb the relative positional relation among them. On the other hand, there may be a case where the ring-like cage 9 per se is displaced. Specifically, the ring-like cage 9 is not guided with respect to the radial position and hence, there may occur misalignment between the axis of the ring-like cage 9 and the axis of the bearing assembly 1 in the standard state. In order to prevent such a displacement of the ring-like cage and to maintain the PCD of the individual balls 8, the pre-load may be applied between the outside and inside members by means of the pre-load applying screws or the like, thereby preventing the individual balls 8 as the rolling elements from sliding on the outer and inner races 5, 7. In the case of the displacement of the ring-like cage 9, the position of the ring-like cage may be quite easily corrected for position while the bearing assembly 1 remains in the assembled state, as described above.

A material for the bearing assembly 1 is not particularly limited. From the standpoint of reducing the weight of the bearing assembly 1, however, the axially outside case 4 and the axially inside case 6 may preferably be formed from the light metal such as an aluminum alloy or a resin, while the inner race 7 and the outer race 5 may preferably be formed from a bearing steel, a stainless steel alloy, a ceramic material or the like. In such a constitution, only the outer and inner races 5, 7 of the axially outside member 2 and the axially inside member 3 may be formed from a material, such as a bearing steel, which has high hardness and fatigue resistance, the outer and inner races contacting the balls 8 as the rolling elements. On the other hand, the axially outside case 4 and the axially inside case 6 may be formed from a light material such as an aluminum alloy so as to reduce the weight of the bearing assembly 1. In common practice, the ring-like cage 9 is formed from a resin or the like, whereas the balls 8 are formed from a bearing steel or the like. The shield c13 may be formed from a stainless steel or a resin.

Figure 14:
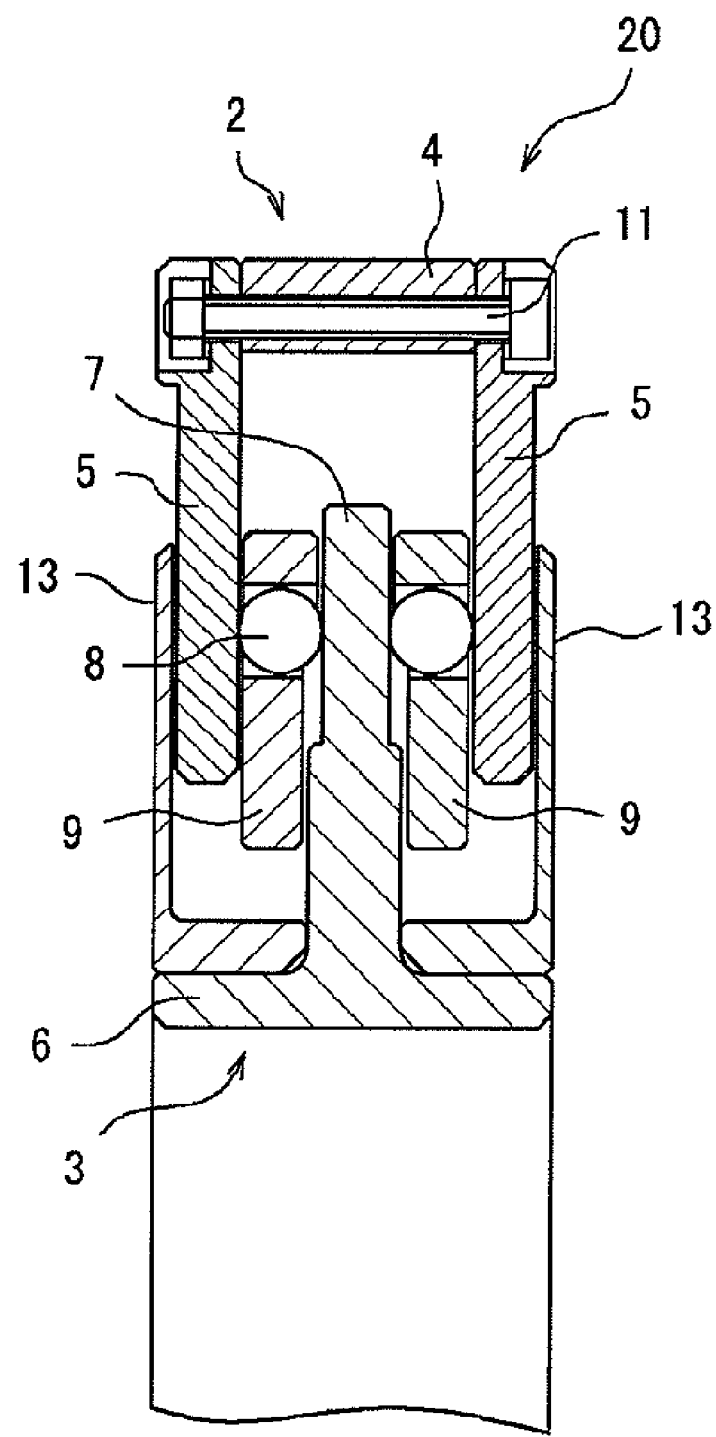
FIG. 14 is a sectional view showing an eccentric thrust bearing assembly according to a second embodiment of the fourth aspect of the invention.

FIG. 14 is a sectional view showing a bearing assembly 20 (the lower half from its axis is omitted) according to a second embodiment of the fourth aspect of the invention. Unlike the bearing assembly 1 of the first embodiment, this bearing assembly 20 includes an axially inside member 3 formed in one piece. That is, the inner race 7 is unified with the axially inside case 6. Such a constitution is preferred in that the number of components is decreased and that the bearing assembly 20 is decreased in the axial thickness. However, this constitution is disadvantageous from the viewpoint of the weight reduction because the whole body of the axially inside member 3 is formed from a bearing steel or the like in order to form the inner race 7 from the bearing steel or the like. It is preferred from the viewpoint of the weight reduction that the inner race 7 and the axially inside case 6 are the separate members, as illustrated by the bearing assembly 1 according to the first embodiment.

Figure 15:
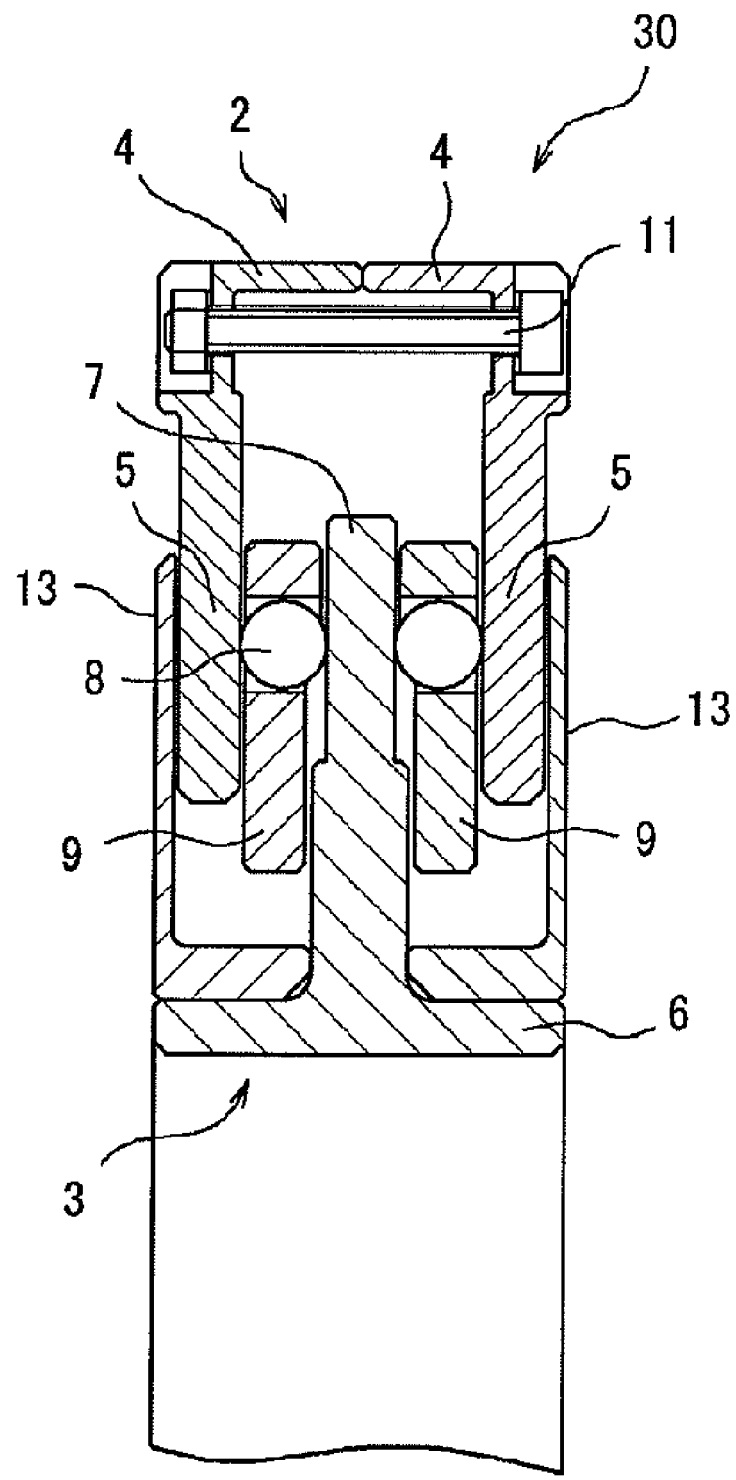
FIG. 15 is a sectional view showing an eccentric thrust bearing assembly according to a third embodiment of the fourth aspect of the invention.

FIG. 15 is a sectional view showing a bearing assembly 30 (the lower half from its axis is omitted) according to a third embodiment of the fourth aspect of the invention. Likewise to the bearing assembly 20 of the second embodiment, this bearing assembly 30 includes an axially inside member 3 formed in one piece. In addition, an axially outside member 2 of this bearing assembly is also formed in one piece. That is, the axially outside case 4 is unified with the outer race 5. Such a constitution is preferred in that the number of components is further decreased and that the bearing assembly is decreased in the axial thickness. However, this constitution is disadvantageous from the viewpoint of the weight reduction, as described above. It is preferred from the viewpoint of the weight reduction that the inner race 7 and the axially inside case 6 are the separate members, whereas the axially outside case 4 and the outer race 5 are the separate members, as illustrated by the bearing assembly 1 of the first embodiment.

In a case where the bearing assembly according to the fourth aspect of the invention is used as an assemble member mounted to an external device other than the bearing assembly, which is provided with means using, for example, a reaction force of rubber, spring or the like for restricting the decentering range of the bearing assembly, if a range restricted by the above means is smaller than the decenterable range of the bearing assembly, the bearing assembly does not encounter interference with the components of the device.

The above embodiments illustrate the examples where the axially outside member 2 is disposed on the radially outer side, whereas the axially inside member 3 is disposed on the radially inner side of the axially outside member 2. Conversely, the axially outside member 2 may be disposed on the radially inner side, whereas the axially inside member 3 may be disposed on the radially outer side of the axially outside member 2. In this case, the annular inner race 7 of the axially inside member 3 is projected radially inwardly from the axially inside case 6.

As described above, the fourth aspect of the invention may provide a double-row eccentric thrust bearing assembly adapted for free relative rotation, which can be reduced in size and weight by defining more suitable gaps between respective pairs of the members thereof with respect to the decenterable range thereof.

What is claimed is:
1. A double-row eccentric thrust bearing assembly comprising:
two axially outside cases axially opposing each other and integrally interconnected; and an axially inside case interposed between these axially outside cases, wherein three or more inner races are provided on the axially inside case on each of its opposing sides to each of the axially outside cases as separately located along a circumferential direction, whereas three or more outer races are provided on each of the two axially outside cases as separately located at positions opposite the respective inner races, the inner race and the outer race in opposing relation clamping a rolling element therebetween, and wherein movable ranges of the individual rolling elements between the respective pairs of the races separately disposed are all substantially equal to one another.

2. A double-row eccentric thrust bearing assembly according to claim 1, wherein a relatively movable range provided by a gap between the axially inside case and the axially outside case substantially corresponds to the movable range of the rolling element.

3. A double-row eccentric thrust bearing assembly according to claim 1, wherein all the inner and outer races are arranged with the same pitch circle diameter and uniformly distributed along the circumferential direction.

4. A double-row eccentric thrust bearing assembly according to claim 3, wherein all the inner and outer races have a circular shape of the same radius, and the axially outside cases and the axially inside case have annular shapes.

5. A double-row eccentric thrust bearing assembly according to claim 1, further comprising a cage guide disposed around each of the inner and outer races.

6. A double-row eccentric thrust bearing assembly comprising:
two annular axially outside members coaxially opposing each other and integrally interconnected; and
an annular axially inside member coaxially interposed between these two axially outside members,
each of the two axially outside members including: an annular axially outside case; and an outer race formed of an annular plate mounted to an inner side of the axially outside case,
the axially inside member including: an annular axially inside case; and an inner race formed of an annular plate radially projecting from the axially inside case,
a plurality of rolling elements clamped between either side of the inner race and a respective opposing side of the two outer races to the inner race,
the bearing assembly further comprising a rolling-element guide fixed to the axially inside member or the axially outside member and serving to limit a movable range of each of the rolling elements to a predetermined range.

7. A double-row eccentric thrust bearing assembly according to claim 6, wherein the predetermined range limited by the rolling-element guide is a circular range of a predetermined radius.

8. A double-row eccentric thrust bearing assembly according to claim 6, wherein a relatively movable range provided by a radial gap between the axially outside member and the axially inside member substantially corresponds to the movable range of the rolling element.

9. A double-row eccentric thrust bearing assembly according to claim 6, wherein the rolling-element guide has an annular shape and is formed with three or more movable-range delimiting holes arranged on the same circle with equal circumferential spacing, whereas one rolling element is disposed in each of the movable-range delimiting holes.

10. A double-row eccentric thrust bearing assembly according to claim 6, wherein a radially movable distance of the rolling element limited by the rolling-element guide substantially corresponds to a radial width of the inner race or the outer race.

11. A double-row eccentric thrust bearing assembly comprising:
- two annular axially outside members coaxially opposing each other and integrally interconnected; and
- an annular axially inside member coaxially interposed between these two axially outside members,
- each of the two axially outside members including: an annular axially outside case; and an outer race formed of an annular plate mounted to the axially outside case,
- the axially inside member including: an annular axially inside case; and an inner race formed of an annular plate radially projecting from the axially inside case,
- a plurality of rolling elements clamped between either side of the inner race and a respective opposing side of the two outer races to the inner race,
- the bearing assembly wherein a relatively movable range provided by a radial gap between the axially outside member and the axially inside member substantially corresponds to a radially movable distance of the rolling element.

12. A double-row eccentric thrust bearing assembly according to claim 11, wherein the plural rolling elements are circumferentially arranged with equal spacing and provided with an annular cage for rollably retaining the rolling elements as maintaining the relative positional relation thereof, and wherein the radially movable distance of the rolling elements is provided by a radial gap between the cage and the axially inside member and between the cage and the axially outside member.

* * * * *